(12) United States Patent
Goldman et al.

(10) Patent No.: US 11,933,967 B2
(45) Date of Patent: *Mar. 19, 2024

(54) DISTALLY ACTUATED SCANNING MIRROR

(71) Applicant: Red Creamery, LLC, Massapequa, NY (US)

(72) Inventors: Ron Goldman, Cold Spring Harbor, NY (US); Dmitry Yavid, Stony Brook, NY (US); Igor Paprotny, Chicago, IL (US); Christopher Silvio Cosentino, Union City, NJ (US)

(73) Assignee: RED Creamery, LLC, Massapequa Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,139

(22) Filed: Oct. 12, 2022

(65) Prior Publication Data

US 2023/0103088 A1    Mar. 30, 2023

Related U.S. Application Data

(63) Continuation of application No. 17/000,464, filed on Aug. 24, 2020, now Pat. No. 11,556,000.
(Continued)

(51) Int. Cl.
*G02B 26/08*    (2006.01)
(52) U.S. Cl.
CPC .............................. *G02B 26/0858* (2013.01)
(58) Field of Classification Search
None
See application file for complete search history.

(56) References Cited

U.S. PATENT DOCUMENTS

| 3,636,250 A | 1/1972 | Haeff |
| 4,240,746 A | 12/1980 | Courtenay |

(Continued)

FOREIGN PATENT DOCUMENTS

| CN | 1106534 A | 8/1995 |
| CN | 1576123 A | 2/2005 |

(Continued)

OTHER PUBLICATIONS

US 11,068,723 B1, 07/2021, Beijbom (withdrawn)

*Primary Examiner* — Jennifer D. Carruth
(74) *Attorney, Agent, or Firm* — Thomas A. O'Rourke; James Bongiorno; O'Rourke IP Law, PLLC

(57) ABSTRACT

A distally-actuated scanning mirror includes: a mirror block with reflective surface on one side; torsional hinges with proximal ends rigidly attached to the mirror block, and with distal ends attached to flexural structures configured to transform translational motion of the piezoelectric elements into rotational motion of the distal ends of the hinges; and piezoelectric elements providing such translational motion. The distally-actuated scanning mirror also includes flexural structures made of separate flexures attached to the opposite surfaces of the distal ends of the hinges, which flexural structures have defined thinned-down flexural points. Portions of the distally-actuated scanning mirror may be 3D printed and/or fabricated by silicon MEMS technology. The mirror is fabricated from a Silicon-on-Insulator wafer, having a relatively thick (e.g., 380 um) handle layer, and a relatively thin e.g., 50 um), where photolithography with backside-alignment allows separate patterning of these two layers.

12 Claims, 11 Drawing Sheets

Related U.S. Application Data

(60) Provisional application No. 62/890,189, filed on Aug. 22, 2019.

(56) References Cited

U.S. PATENT DOCUMENTS

| | | |
|---|---|---|
| 4,397,549 A | 8/1983 | Morgan |
| 4,627,734 A | 12/1986 | Rioux |
| 4,820,914 A | 4/1989 | Allen |
| 4,862,257 A | 8/1989 | Ulich |
| 4,941,719 A | 7/1990 | Hisada |
| 4,964,721 A | 10/1990 | Ulich |
| 4,967,270 A | 10/1990 | Ulich |
| 5,006,721 A | 4/1991 | Cameron |
| 5,013,917 A | 5/1991 | Ulich |
| 5,091,778 A | 2/1992 | Keeler |
| 5,096,293 A | 3/1992 | Cecchi |
| 5,157,257 A | 10/1992 | Geiger |
| 5,159,225 A | 10/1992 | Um |
| 5,164,784 A | 11/1992 | Waggoner |
| 5,164,823 A | 11/1992 | Keeler |
| 5,166,507 A | 11/1992 | Davis |
| 5,192,978 A | 3/1993 | Keeler |
| 5,198,657 A | 3/1993 | Trost |
| 5,200,606 A | 4/1993 | Krasutsky |
| 5,206,698 A | 4/1993 | Werner |
| 5,220,164 A | 6/1993 | Lieber |
| 5,221,927 A | 6/1993 | Palmer |
| 5,221,956 A | 6/1993 | Patterson |
| 5,231,401 A | 7/1993 | Kaman |
| 5,231,480 A | 7/1993 | Ulich |
| 5,233,415 A | 8/1993 | French |
| 5,239,352 A | 8/1993 | Bissonnette |
| 5,241,314 A | 8/1993 | Keeler |
| 5,243,541 A | 9/1993 | Ulich |
| 5,250,810 A | 10/1993 | Geiger |
| 5,255,065 A | 10/1993 | Schwemmer |
| 5,257,085 A | 10/1993 | Ulich |
| 5,270,780 A | 12/1993 | Moran |
| 5,270,929 A | 12/1993 | Paulson |
| 5,272,351 A | 12/1993 | Andressen |
| 5,303,084 A | 4/1994 | Pflibsen |
| 5,311,272 A | 5/1994 | Daniels |
| 5,335,070 A | 8/1994 | Pflibsen |
| 5,343,284 A | 8/1994 | Keeler |
| 5,353,054 A | 10/1994 | Geiger |
| 5,384,589 A | 1/1995 | Ulich |
| 5,442,358 A | 8/1995 | Keeler |
| 5,450,125 A | 9/1995 | Ulich |
| 5,457,639 A | 10/1995 | Ulich |
| 5,467,122 A | 11/1995 | Bowker |
| 5,534,993 A | 7/1996 | Ball |
| 5,546,183 A | 8/1996 | Fegley |
| 5,570,224 A | 10/1996 | Endo |
| 5,574,553 A | 11/1996 | McManamon |
| 5,608,514 A | 3/1997 | Stann |
| 5,644,386 A | 7/1997 | Jenkins |
| 5,667,304 A | 9/1997 | Gelbwachs |
| 5,670,935 A | 9/1997 | Schofield |
| 5,682,225 A | 10/1997 | DuBois |
| 5,724,125 A | 3/1998 | Ames |
| 5,767,519 A | 6/1998 | Gelbwachs |
| 5,778,019 A | 7/1998 | Churnside |
| 5,796,471 A | 8/1998 | Wilkerson |
| 5,822,047 A | 10/1998 | Contarino |
| 5,825,464 A | 10/1998 | Feichtner |
| 5,831,719 A | 11/1998 | Berg |
| 5,831,724 A | 11/1998 | Cordes |
| 5,835,199 A | 11/1998 | Phillips |
| 5,847,815 A | 12/1998 | Albouy |
| 5,847,816 A | 12/1998 | Zediker |
| 5,847,817 A | 12/1998 | Zediker |
| 5,870,180 A | 2/1999 | Wangler |
| 5,877,851 A | 3/1999 | Stann |
| 5,898,483 A | 4/1999 | Flowers |
| 5,914,776 A | 6/1999 | Streicher |
| 5,989,087 A | 11/1999 | Cordes |
| 6,042,050 A | 3/2000 | Sims |
| 6,084,659 A | 7/2000 | Tulet |
| 6,147,747 A | 11/2000 | Kavaya |
| 6,246,468 B1 | 6/2001 | Dimsdale |
| 6,302,355 B1 | 10/2001 | Sallee |
| 6,323,941 B1 | 11/2001 | Evans |
| 6,371,405 B1 | 4/2002 | Sallee |
| 6,381,007 B2 | 4/2002 | Fabre |
| 6,388,739 B1 | 5/2002 | Rice |
| 6,396,397 B1 | 5/2002 | Bos |
| 6,396,577 B1 | 5/2002 | Ramstack |
| 6,404,494 B1 | 6/2002 | Masonis |
| 6,441,889 B1 | 8/2002 | Patterson |
| 6,448,572 B1 | 9/2002 | Tennant |
| 6,522,396 B1 | 2/2003 | Halmos |
| 6,556,282 B2 | 4/2003 | Jamieson |
| 6,559,932 B1 | 5/2003 | Halmos |
| 6,577,417 B1 | 6/2003 | Khoury |
| 6,593,582 B2 | 7/2003 | Lee |
| 6,608,669 B2 | 8/2003 | Holton |
| 6,608,677 B1 | 8/2003 | Ray |
| 6,618,125 B2 | 9/2003 | Stann |
| 6,619,406 B1 | 9/2003 | Kacyra |
| 6,634,600 B2 | 10/2003 | Krawczyk |
| 6,636,300 B2 | 10/2003 | Doemens |
| 6,646,725 B1 | 11/2003 | Eichinger |
| 6,664,529 B2 | 12/2003 | Pack |
| 6,711,475 B2 | 2/2004 | Murphy |
| 6,714,286 B1 | 3/2004 | Wheel |
| 6,717,655 B2 | 4/2004 | Cheng |
| 6,724,470 B2 | 4/2004 | Barenz |
| 6,781,683 B2 | 8/2004 | Kacyra |
| 6,836,285 B1 | 12/2004 | Lubard |
| 6,844,924 B2 | 1/2005 | Ruff |
| 6,873,716 B1 | 3/2005 | Bowker |
| 6,875,978 B2 | 4/2005 | Halmos |
| 6,882,409 B1 | 4/2005 | Evans |
| 6,963,354 B1 | 11/2005 | Scheps |
| 7,010,339 B2 | 3/2006 | Mullen |
| 7,046,358 B2 | 5/2006 | Barker |
| 7,064,810 B2 | 6/2006 | Anderson |
| 7,064,817 B1 | 6/2006 | Schmitt |
| 7,067,812 B2 | 6/2006 | Gelbwachs |
| 7,104,453 B1 | 9/2006 | Zhu |
| 7,130,028 B2 | 10/2006 | Pain |
| 7,135,672 B2 | 11/2006 | Land |
| 7,164,468 B2 | 1/2007 | Correia Da Silva Vilar |
| 7,164,787 B1 | 1/2007 | Nevis |
| 7,164,788 B1 | 1/2007 | Nevis |
| 7,187,452 B2 | 3/2007 | Jupp |
| 7,190,854 B1 | 3/2007 | Novotny |
| 7,195,163 B2 | 3/2007 | Yoo |
| 7,203,339 B1 | 4/2007 | Nevis |
| 7,206,062 B2 | 4/2007 | Asbrock |
| 7,215,826 B1 | 5/2007 | Nevis |
| 7,227,625 B2 | 6/2007 | Kobayashi |
| 7,242,460 B2 | 7/2007 | Hsu |
| 7,248,342 B1 | 7/2007 | Degnan |
| 7,248,343 B2 | 7/2007 | Cardero |
| 7,260,507 B2 | 8/2007 | Kalayeh |
| 7,274,448 B2 | 9/2007 | Babbin |
| 7,281,891 B2 | 10/2007 | Smith |
| 7,301,608 B1 | 11/2007 | Mendenhall |
| 7,312,855 B1 | 12/2007 | Hintz |
| 7,313,506 B2 | 12/2007 | Kacyra |
| 7,333,184 B2 | 2/2008 | Kalayeh |
| 7,336,345 B2 | 2/2008 | Krasutsky |
| 7,339,670 B2 | 3/2008 | Carrig |
| 7,345,744 B2 | 3/2008 | Halmos |
| 7,359,039 B2 | 4/2008 | Kloza |
| 7,361,922 B2 | 4/2008 | Kameyama |
| 7,375,804 B2 | 5/2008 | Liebman |
| 7,375,877 B1 | 5/2008 | Di Teodoro |
| 7,397,568 B2 | 7/2008 | Bryce |
| 7,400,384 B1 | 7/2008 | Evans |
| 7,411,196 B2 | 8/2008 | Kalayeh |
| 7,411,662 B1 | 8/2008 | Ruff |
| 7,417,717 B2 | 8/2008 | Pack |

(56) References Cited

U.S. PATENT DOCUMENTS

| | | |
|---|---|---|
| 7,428,041 B2 | 9/2008 | Kallio |
| 7,436,494 B1 | 10/2008 | Kennedy |
| 7,440,084 B2 | 10/2008 | Kane |
| 7,463,340 B2 | 12/2008 | Krishnaswamy |
| 7,463,341 B2 | 12/2008 | Halldorsson |
| 7,474,332 B2 | 1/2009 | Byren |
| 7,474,964 B1 | 1/2009 | Welty |
| 7,485,862 B2 | 2/2009 | Danziger |
| 7,495,764 B1 | 2/2009 | McMillan |
| 7,505,488 B2 | 3/2009 | Halmos |
| 7,532,311 B2 | 5/2009 | Henderson |
| 7,561,261 B2 | 7/2009 | Hilde |
| 7,570,347 B2 | 8/2009 | Ruff |
| 7,571,081 B2 | 8/2009 | Faulkner |
| 7,580,127 B1 | 8/2009 | Mayor |
| 7,583,364 B1 | 9/2009 | Mayor |
| 7,630,062 B2 | 12/2009 | Mori |
| 7,649,616 B2 | 1/2010 | Michael |
| 7,652,752 B2 | 1/2010 | Fetzer |
| 7,656,526 B1 | 2/2010 | Spuler |
| 7,675,610 B2 | 3/2010 | Redman |
| 7,675,619 B2 | 3/2010 | Danehy |
| 7,683,928 B2 | 3/2010 | Lubard |
| 7,688,348 B2 | 3/2010 | Lubard |
| 7,688,374 B2 | 3/2010 | Land |
| 7,692,775 B2 | 4/2010 | Treado |
| 7,697,125 B2 | 4/2010 | Swenson |
| 7,697,794 B2 | 4/2010 | Dragic |
| 7,701,558 B2 | 4/2010 | Walsh |
| 7,720,580 B2 | 5/2010 | Higgins-Luthman |
| 7,720,605 B2 | 5/2010 | Welty |
| 7,739,823 B2 | 6/2010 | Shapira |
| 7,741,618 B2 | 6/2010 | Lee |
| 7,742,151 B2 | 6/2010 | Krasutsky |
| 7,746,450 B2 | 6/2010 | Williner |
| 7,755,745 B2 | 7/2010 | Urata |
| 7,760,334 B1 | 7/2010 | Evans |
| 7,800,736 B2 | 9/2010 | Pack |
| 7,821,619 B2 | 10/2010 | Krikorian |
| 7,827,861 B2 | 11/2010 | White |
| 7,830,442 B2 | 11/2010 | Griffis |
| 7,847,235 B2 | 12/2010 | Krumpkin |
| 7,894,044 B1 | 2/2011 | Sullivan |
| 7,933,002 B2 | 4/2011 | Halldorsson |
| 7,936,448 B2 | 5/2011 | Albuquerque |
| 7,944,547 B2 | 5/2011 | Wang |
| 7,948,610 B2 | 5/2011 | Hintz |
| 7,961,301 B2 | 6/2011 | Earhart |
| 7,969,558 B2 | 6/2011 | Hall |
| 7,974,813 B2 | 7/2011 | Welty |
| 7,983,738 B2 | 7/2011 | Goldman |
| 7,986,397 B1 | 7/2011 | Tiemann |
| 8,010,300 B1 | 8/2011 | Stearns |
| 8,024,135 B2 | 9/2011 | Lee |
| 8,054,454 B2 | 11/2011 | Treado |
| 8,054,464 B2 | 11/2011 | Mathur |
| 8,072,581 B1 | 12/2011 | Breiholz |
| 8,072,582 B2 | 12/2011 | Meneely |
| 8,072,663 B2 | 12/2011 | O'Neil |
| 8,077,294 B1 | 12/2011 | Grund |
| 8,081,301 B2 | 12/2011 | Stann |
| 8,090,153 B2 | 1/2012 | Schofield |
| 8,098,889 B2 | 1/2012 | Zhu |
| 8,115,622 B2 | 2/2012 | Stolarczyk |
| 8,115,925 B1 | 2/2012 | Mathur |
| 8,120,754 B2 | 2/2012 | Kaehler |
| 8,121,798 B2 | 2/2012 | Lippert |
| 8,125,367 B2 | 2/2012 | Ludwig |
| 8,125,622 B2 | 2/2012 | Gammenthaler |
| 8,135,513 B2 | 3/2012 | Bauer |
| 8,139,863 B1 | 3/2012 | Hsu |
| 8,164,742 B1 | 4/2012 | Carrieri |
| 8,179,521 B2 | 5/2012 | Valla |
| 8,198,576 B2 | 6/2012 | Kennedy |
| 8,224,097 B2 | 7/2012 | Matei |
| 8,229,663 B2 | 7/2012 | Zeng |
| 8,229,679 B1 | 7/2012 | Matthews |
| 8,242,428 B2 | 8/2012 | Meyers |
| 8,244,026 B2 | 8/2012 | Nahari |
| 8,269,950 B2 | 9/2012 | Spinelli |
| RE43,722 E | 10/2012 | Kennedy |
| 8,279,420 B2 | 10/2012 | Ludwig |
| 8,284,382 B2 | 10/2012 | Krasutsky |
| 8,294,881 B2 | 10/2012 | Hellickson |
| 8,306,273 B1 | 11/2012 | Gravseth |
| 8,306,941 B2 | 11/2012 | Ma |
| 8,325,328 B2 | 12/2012 | Renard |
| 8,332,134 B2 | 12/2012 | Zhang |
| 8,344,942 B2 | 1/2013 | Jin |
| 8,362,889 B2 | 1/2013 | Komori |
| 8,386,876 B2 | 2/2013 | Khoshnevis |
| 8,427,649 B2 | 4/2013 | Hays |
| 8,441,622 B2 | 5/2013 | Gammenthaler |
| 8,446,571 B2 | 5/2013 | Fiess |
| 8,465,478 B2 | 6/2013 | Frey |
| 8,478,386 B2 | 7/2013 | Goldman |
| 8,493,445 B2 | 7/2013 | Degnan |
| 8,494,687 B2 | 7/2013 | Vanek |
| 8,508,721 B2 | 8/2013 | Cates |
| 8,537,337 B2 | 9/2013 | Welty |
| 8,537,338 B1 | 9/2013 | Medasani |
| 8,538,695 B2 | 9/2013 | Welty |
| 8,541,744 B1 | 9/2013 | Liu |
| 8,558,993 B2 | 10/2013 | Newbury |
| 8,577,611 B2 | 11/2013 | Ma |
| 8,587,637 B1 | 11/2013 | Cryder |
| 8,599,365 B2 | 12/2013 | Ma |
| 8,599,367 B2 | 12/2013 | Canham |
| 8,600,589 B2 | 12/2013 | Mendez-Rodriguez |
| 8,605,262 B2 | 12/2013 | Campbell |
| 8,610,881 B2 | 12/2013 | Gammenthaler |
| 8,629,975 B1 | 1/2014 | Dierking |
| 8,629,977 B2 | 1/2014 | Phillips |
| 8,648,702 B2 | 2/2014 | Pala |
| 8,655,513 B2 | 2/2014 | Vanek |
| 8,659,747 B2 | 2/2014 | Goodman |
| 8,659,748 B2 | 2/2014 | Fakin |
| 8,670,591 B2 | 3/2014 | Mendez-Rodriguez |
| 8,675,181 B2 | 3/2014 | Hall |
| 8,675,184 B2 | 3/2014 | Schmitt |
| 8,692,980 B2 | 4/2014 | Gilliland |
| 8,692,983 B1 | 4/2014 | Chapman |
| 8,712,147 B2 | 4/2014 | Rahmes |
| 8,717,545 B2 | 5/2014 | Sebastian |
| 8,724,099 B2 | 5/2014 | Asahara |
| 8,736,818 B2 | 5/2014 | Weimer |
| 8,767,187 B2 | 7/2014 | Coda |
| 8,767,190 B2 | 7/2014 | Hall |
| 8,775,081 B2 | 7/2014 | Welty |
| 8,781,790 B2 | 7/2014 | Zhu |
| 8,786,835 B1 | 7/2014 | Reardon |
| 8,797,512 B2 | 8/2014 | Stettner |
| 8,798,372 B1 | 8/2014 | Korchev |
| 8,798,841 B1 | 8/2014 | Nickolaou |
| 8,804,101 B2 | 8/2014 | Spagnolia |
| 8,818,124 B1 | 8/2014 | Kia |
| 8,818,722 B2 | 8/2014 | Elgersma |
| 8,829,417 B2 | 9/2014 | Krill |
| 8,836,922 B1 | 9/2014 | Pennecot |
| 8,855,848 B2 | 10/2014 | Zeng |
| 8,855,849 B1 | 10/2014 | Ferguson |
| 8,885,883 B2 | 11/2014 | Goodman |
| 8,891,069 B2 | 11/2014 | Pedersen |
| 8,896,818 B2 | 11/2014 | Walsh |
| 8,915,709 B2 | 12/2014 | Westergaard |
| 8,938,362 B2 | 1/2015 | Ionov |
| 8,939,081 B1 | 1/2015 | Smith |
| 8,947,644 B2 | 2/2015 | Halmos |
| 8,947,647 B2 | 2/2015 | Halmos |
| 8,958,057 B2 | 2/2015 | Kane |
| 8,976,339 B2 | 3/2015 | Phillips |
| 8,976,340 B2 | 3/2015 | Gilliland |
| 8,976,342 B2 | 3/2015 | Lacondemine |
| 9,002,511 B1 | 4/2015 | Hickerson |

(56) References Cited

U.S. PATENT DOCUMENTS

| | | | |
|---|---|---|---|
| 9,007,569 | B2 | 4/2015 | AmZajerdian |
| 9,007,570 | B1 | 4/2015 | Beyon |
| 9,041,915 | B2 | 5/2015 | Earhart |
| 9,046,600 | B2 | 6/2015 | James |
| 9,056,395 | B1 | 6/2015 | Ferguson |
| 9,057,605 | B2 | 6/2015 | Halmos |
| 9,069,059 | B2 | 6/2015 | Vogt |
| 9,069,061 | B1 | 6/2015 | Harwit |
| 9,069,080 | B2 | 6/2015 | Stettner |
| 9,081,090 | B2 | 7/2015 | Sebastian |
| 9,086,275 | B2 | 7/2015 | Weinberg |
| 9,086,486 | B2 | 7/2015 | Gilliland |
| 9,098,753 | B1 | 8/2015 | Zhu |
| 9,103,907 | B2 | 8/2015 | Sebastian |
| 9,110,154 | B1 | 8/2015 | Bates |
| 9,110,163 | B2 | 8/2015 | Rogan |
| 9,110,169 | B2 | 8/2015 | Stettner |
| 9,111,444 | B2 | 8/2015 | Kaganovich |
| 9,128,185 | B2 | 9/2015 | Zeng |
| 9,128,190 | B1 | 9/2015 | Ulrich |
| 9,129,211 | B2 | 9/2015 | Zeng |
| 9,134,402 | B2 | 9/2015 | Sebastian |
| 9,146,102 | B2 | 9/2015 | Pernstich |
| 9,165,383 | B1 | 10/2015 | Mendez-Rodriguez |
| 9,170,096 | B2 | 10/2015 | Fowler |
| 9,188,674 | B2 | 11/2015 | Suzuki |
| 9,188,677 | B2 | 11/2015 | Bossert |
| 9,201,146 | B2 | 12/2015 | Beyon |
| 9,215,382 | B1 | 12/2015 | Hilde |
| 9,223,025 | B2 | 12/2015 | Debrunner |
| 9,229,108 | B2 | 1/2016 | Debrunner |
| 9,229,109 | B2 | 1/2016 | Stettner |
| 9,244,272 | B2 | 1/2016 | Schiltz |
| 9,255,989 | B2 | 2/2016 | Joshi |
| 9,277,204 | B2 | 3/2016 | Gilliland |
| 9,285,464 | B2 | 3/2016 | Pennecot |
| 9,300,321 | B2 | 3/2016 | Zalik |
| 9,310,471 | B2 | 4/2016 | Sayyah |
| 9,310,487 | B2 | 4/2016 | Sakimura |
| 9,315,192 | B1 | 4/2016 | Zhu |
| 9,335,414 | B2 | 5/2016 | Leyva |
| 9,354,317 | B2 | 5/2016 | Halmos |
| 9,354,825 | B2 | 5/2016 | Kozak |
| 9,360,554 | B2 | 6/2016 | Retterath |
| 9,360,555 | B2 | 6/2016 | Oh |
| 9,361,412 | B1 | 6/2016 | Hilde |
| 9,366,938 | B1 | 6/2016 | Anderson |
| 9,369,689 | B1 | 6/2016 | Tran |
| 9,378,463 | B2 | 6/2016 | Zeng |
| 9,383,447 | B2 | 7/2016 | Schmitt |
| 9,383,753 | B1 | 7/2016 | Templeton |
| 9,407,285 | B2 | 8/2016 | Kozak |
| 9,420,177 | B2 | 8/2016 | Pettegrew |
| 9,420,264 | B2 | 8/2016 | Gilliland |
| 9,425,654 | B2 | 8/2016 | Lenius |
| 9,448,110 | B2 | 9/2016 | Wong |
| 9,453,907 | B2 | 9/2016 | Zheleznyak |
| 9,453,914 | B2 | 9/2016 | Stettner |
| 9,453,941 | B2 | 9/2016 | Stainvas Olshansky |
| 9,465,112 | B2 | 10/2016 | Stettner |
| 9,470,520 | B2 | 10/2016 | Schwarz |
| 9,476,968 | B2 | 10/2016 | Anderson |
| 9,476,983 | B2 | 10/2016 | Zeng |
| 9,489,746 | B2 | 11/2016 | Sebastian |
| 9,495,466 | B2 | 11/2016 | Geringer |
| 9,519,979 | B1 | 12/2016 | Hilde |
| 9,523,772 | B2 | 12/2016 | Rogan |
| 9,525,863 | B2 | 12/2016 | Nawasara |
| 9,529,087 | B2 | 12/2016 | Stainvas Olshansky |
| 9,530,062 | B2 | 12/2016 | Nguyen |
| 9,547,074 | B2 | 1/2017 | Schulz |
| 9,575,162 | B2 | 2/2017 | Owechko |
| 9,575,164 | B2 | 2/2017 | Kim |
| 9,575,184 | B2 | 2/2017 | Gilliland |
| 9,575,341 | B2 | 2/2017 | Heck |
| 9,588,220 | B2 | 3/2017 | Rondeau |
| 9,599,468 | B2 | 3/2017 | Walsh |
| 9,599,714 | B2 | 3/2017 | Imaki |
| 9,602,224 | B1 | 3/2017 | McLaughlin |
| 9,606,236 | B2 | 3/2017 | Rojas |
| 9,625,580 | B2 | 4/2017 | Kotelnikov |
| 9,625,582 | B2 | 4/2017 | Gruver |
| 9,651,658 | B2 | 5/2017 | Pennecot |
| 9,658,322 | B2 | 5/2017 | Lewis |
| 9,658,337 | B2 | 5/2017 | Ray |
| 9,678,199 | B2 | 6/2017 | Hutson |
| 9,702,975 | B2 | 7/2017 | Brinkmeyer |
| 9,710,714 | B2 | 7/2017 | Chen |
| 9,735,885 | B1 | 8/2017 | Sayyah |
| 9,753,124 | B2 | 9/2017 | Hayes |
| 9,753,462 | B2 | 9/2017 | Gilliland |
| 9,759,809 | B2 | 9/2017 | Derenick |
| 9,772,399 | B2 | 9/2017 | Schwarz |
| 9,778,362 | B2 | 10/2017 | Rondeau |
| 9,784,840 | B2 | 10/2017 | Pedersen |
| 9,790,924 | B2 | 10/2017 | Bayon |
| 9,791,555 | B2 | 10/2017 | Zhu |
| 9,791,557 | B1 | 10/2017 | Wyrwas |
| 9,797,995 | B2 | 10/2017 | Gilliland |
| 9,804,264 | B2 | 10/2017 | Villeneuve |
| 9,810,775 | B1 | 11/2017 | Welford |
| 9,810,776 | B2 | 11/2017 | Sapir |
| 9,810,777 | B2 | 11/2017 | Williams |
| 9,810,786 | B1 | 11/2017 | Welford |
| 9,812,838 | B2 | 11/2017 | Villeneuve |
| 9,823,118 | B2 | 11/2017 | Doylend |
| 9,823,350 | B2 | 11/2017 | Fluckiger |
| 9,823,351 | B2 | 11/2017 | Haslim |
| 9,823,353 | B2 | 11/2017 | Eichenholz |
| 9,830,509 | B2 | 11/2017 | Zang |
| 9,831,630 | B2 | 11/2017 | Lipson |
| 9,834,209 | B2 | 12/2017 | Stettner |
| 9,841,495 | B2 | 12/2017 | Campbell |
| 9,851,433 | B2 | 12/2017 | Sebastian |
| 9,851,442 | B1 | 12/2017 | Lo |
| RE46,672 | E | 1/2018 | Hall |
| 9,857,473 | B2 | 1/2018 | Kim |
| 9,860,770 | B1 | 1/2018 | McLaughlin |
| 9,869,753 | B2 | 1/2018 | Eldada |
| 9,869,754 | B1 | 1/2018 | Campbell |
| 9,870,512 | B2 | 1/2018 | Rogan |
| 9,872,010 | B2 | 1/2018 | Tran |
| 9,874,635 | B1 | 1/2018 | Eichenholz |
| 9,877,009 | B2 | 1/2018 | Tran |
| 9,880,263 | B2 | 1/2018 | Droz |
| 9,880,281 | B2 | 1/2018 | Gilliland |
| 9,881,220 | B2 | 1/2018 | Koravadi |
| 9,882,433 | B2 | 1/2018 | Lenius |
| 9,885,778 | B2 | 2/2018 | Dussan |
| 9,891,711 | B1 | 2/2018 | Lee |
| 9,892,567 | B2 | 2/2018 | Binion |
| 9,897,687 | B1 | 2/2018 | Campbell |
| 9,897,689 | B2 | 2/2018 | Dussan |
| 9,904,375 | B1 | 2/2018 | Donnelly |
| 9,905,032 | B2 | 2/2018 | Rogan |
| 9,905,987 | B2 | 2/2018 | Seo |
| 9,905,992 | B1 | 2/2018 | Welford |
| 9,910,136 | B2 | 3/2018 | Heo |
| 9,910,139 | B2 | 3/2018 | Pennecot |
| 9,910,155 | B2 | 3/2018 | Lundquist |
| 9,915,726 | B2 | 3/2018 | Bailey |
| 9,921,297 | B2 | 3/2018 | Jungwirth |
| 9,921,307 | B2 | 3/2018 | Schmalengurg |
| 9,927,524 | B2 | 3/2018 | Kaiser |
| 9,933,513 | B2 | 4/2018 | Dussan |
| 9,933,514 | B1 | 4/2018 | Gylys |
| 9,945,950 | B2 | 4/2018 | Newman |
| 9,958,545 | B2 | 5/2018 | Eichenholz |
| 9,971,035 | B2 | 5/2018 | Imaki |
| 9,983,297 | B2 | 5/2018 | Hall |
| 9,983,590 | B2 | 5/2018 | Templeton |
| 9,985,071 | B2 | 5/2018 | Irish |
| 9,989,969 | B2 | 6/2018 | Eustice |
| 10,000,000 | B2 | 6/2018 | Marron |

(56) References Cited

U.S. PATENT DOCUMENTS

| | | |
|---|---|---|
| 10,012,474 B2 | 7/2018 | Teetzel |
| 10,012,723 B2 | 7/2018 | Lindskog |
| 10,012,732 B2 | 7/2018 | Eichenholz |
| 10,018,711 B1 | 7/2018 | Sebastian |
| 10,018,725 B2 | 7/2018 | Liu |
| 10,018,726 B2 | 7/2018 | Hall |
| 10,019,803 B2 | 7/2018 | Venable |
| 10,024,964 B2 | 7/2018 | Pierce |
| 10,031,214 B2 | 7/2018 | Rosenweig |
| 10,031,231 B2 | 7/2018 | Zermas |
| 10,031,232 B2 | 7/2018 | Zohar |
| 10,032,369 B2 | 7/2018 | Koravadi |
| 10,036,801 B2 | 7/2018 | Reterrath |
| 10,036,803 B2 | 7/2018 | Pacala |
| 10,042,042 B2 | 8/2018 | Miremadi |
| 10,042,043 B2 | 8/2018 | Dussan |
| 10,042,159 B2 | 8/2018 | Dussan |
| 10,046,187 B2 | 8/2018 | Doten |
| 10,048,359 B2 | 8/2018 | Zhelenyzak |
| 10,048,374 B2 | 8/2018 | Hall |
| 10,054,841 B2 | 8/2018 | Nomura |
| 10,061,019 B1 | 8/2018 | Campbell |
| 10,061,020 B2 | 8/2018 | Slobodyanyuk |
| 10,061,266 B2 | 9/2018 | Christmas |
| 10,067,230 B2 | 9/2018 | Smits |
| 10,073,166 B2 | 9/2018 | Dussan |
| 10,078,133 B2 | 9/2018 | Dussan |
| 10,078,137 B2 | 9/2018 | Ludwig |
| D826,746 S | 10/2018 | Qiu |
| 10,088,557 B2 | 10/2018 | Yeun |
| 10,088,558 B2 | 10/2018 | Dussan |
| 10,094,657 B2 | 10/2018 | Kiss |
| 10,094,916 B1 | 10/2018 | Droz |
| 10,094,925 B1 | 10/2018 | LaChapelle |
| 10,094,928 B2 | 10/2018 | Josset |
| 10,107,914 B2 | 10/2018 | Kalscheur |
| 10,107,915 B2 | 10/2018 | Rozenzweig |
| 10,109,208 B2 | 10/2018 | Cherepinsky |
| 10,114,109 B2 | 10/2018 | Gazit |
| 10,114,112 B2 | 10/2018 | Slobodyanyuk |
| 10,115,024 B2 | 10/2018 | Stein |
| 10,120,076 B2 | 11/2018 | Scheim |
| 10,121,813 B2 | 11/2018 | Eichenholz |
| 10,126,411 B2 | 11/2018 | Gilliland |
| 10,126,412 B2 | 11/2018 | Eldada |
| 10,131,446 B1 | 11/2018 | Stambler |
| 10,132,928 B2 | 11/2018 | Eldada |
| 10,139,478 B2 | 11/2018 | Gaalema |
| 10,142,538 B2 | 11/2018 | Hurd |
| 10,145,941 B2 | 12/2018 | Lee |
| 10,145,945 B2 | 12/2018 | Harada |
| 10,148,060 B2 | 12/2018 | Hong |
| 10,151,836 B2 | 12/2018 | O'Keeffe |
| 10,168,423 B2 | 1/2019 | Lombrozo |
| 10,168,429 B2 | 1/2019 | Maleki |
| 10,175,344 B2 | 1/2019 | Jungwirth |
| 10,175,361 B2 | 1/2019 | Haines |
| 10,180,493 B2 | 1/2019 | Eldada |
| 10,185,027 B2 | 1/2019 | O'Keeffe |
| 10,185,028 B2 | 1/2019 | Dussan |
| 10,185,033 B2 | 1/2019 | Justice |
| 10,191,156 B2 | 1/2019 | Steinberg |
| 10,197,669 B2 | 2/2019 | Hall |
| 10,197,676 B2 | 2/2019 | Slobodyyanyuk |
| 10,197,765 B2 | 2/2019 | Schulz |
| 10,203,399 B2 | 2/2019 | Retterath |
| 10,203,401 B2 | 2/2019 | Sebastian |
| 10,209,349 B2 | 2/2019 | Dussan |
| 10,209,359 B2 | 2/2019 | Russell |
| 10,209,709 B2 | 2/2019 | Peters |
| 10,214,299 B2 | 2/2019 | Jackowski |
| 10,215,846 B2 | 2/2019 | Carothers |
| 10,215,847 B2 | 2/2019 | Scheim |
| 10,215,848 B2 | 2/2019 | Dussan |
| 10,215,859 B2 | 2/2019 | Steinberg |
| 10,222,474 B1 | 3/2019 | Raring |
| 10,222,477 B2 | 3/2019 | Keilaf |
| 10,223,806 B1 | 3/2019 | Luo |
| 10,223,807 B1 | 3/2019 | Luo |
| 10,241,196 B2 | 3/2019 | Bailey |
| 10,241,198 B2 | 3/2019 | LaChappelle |
| 10,247,811 B2 | 4/2019 | Clifton |
| 10,254,402 B2 | 4/2019 | Lane |
| 10,254,405 B2 | 4/2019 | Campbell |
| 10,261,006 B2 | 4/2019 | Ray |
| 10,261,187 B2 | 4/2019 | Halmos |
| 10,262,234 B2 | 4/2019 | Li |
| 10,267,898 B2 | 4/2019 | Campbell |
| 10,267,918 B2 | 4/2019 | LaChapelle |
| 10,274,377 B1 | 4/2019 | Rabb |
| 10,274,599 B2 | 4/2019 | Schmalenberg |
| D849,573 S | 5/2019 | Haban |
| 10,281,254 B2 | 5/2019 | Ginsberg |
| 10,281,322 B2 | 5/2019 | Doyland |
| 10,281,564 B2 | 5/2019 | Low |
| 10,281,581 B2 | 5/2019 | Lipson |
| 10,281,582 B2 | 5/2019 | Elooz |
| 10,288,736 B2 | 5/2019 | Lipson |
| 10,288,737 B2 | 5/2019 | Mooney |
| 10,295,656 B1 | 5/2019 | Li |
| 10,295,660 B1 | 5/2019 | McMichael |
| 10,295,668 B2 | 5/2019 | LaChapelle |
| 10,295,670 B2 | 5/2019 | Stettner |
| 10,295,671 B2 | 5/2019 | Grazit |
| 10,295,672 B2 | 5/2019 | Abari |
| 10,295,673 B1 | 5/2019 | Tucker |
| 10,302,746 B2 | 5/2019 | O'Keeffe |
| 10,302,749 B2 | 5/2019 | Droz |
| D850,306 S | 6/2019 | Bainter |
| 10,310,058 B1 | 6/2019 | Campbell |
| 10,310,087 B2 | 6/2019 | Laddha |
| 10,317,529 B2 | 6/2019 | Shy |
| 10,317,533 B2 | 6/2019 | Cherepinsky |
| 10,324,170 B1 | 6/2019 | Enberg |
| 10,324,185 B2 | 6/2019 | McWhirter |
| 10,330,777 B2 | 6/2019 | Popovich |
| 10,330,778 B2 | 6/2019 | Kaneda |
| 10,330,780 B2 | 6/2019 | Hall |
| 10,331,956 B2 | 6/2019 | Solar |
| 10,353,074 B2 | 6/2019 | Justice |
| 10,337,996 B2 | 7/2019 | Blagojevic |
| 10,338,201 B2 | 7/2019 | Slobodyyanyuk |
| 10,338,202 B2 | 7/2019 | Mashtare |
| 10,338,220 B1 | 7/2019 | Raring |
| 10,338,224 B2 | 7/2019 | Eken |
| 10,338,225 B2 | 7/2019 | Boehmke |
| 10,340,651 B1 | 7/2019 | Drummer |
| 10,345,446 B2 | 7/2019 | Raring |
| 10,345,447 B1 | 7/2019 | Hicks |
| 10,346,695 B2 | 7/2019 | Clifford |
| 10,351,103 B2 | 7/2019 | Yeo |
| 10,353,057 B2 | 7/2019 | Suzuki |
| 10,353,075 B2 | 7/2019 | Buskila |
| 10,359,507 B2 | 7/2019 | Berger |
| 10,366,282 B2 | 7/2019 | Lee |
| 10,372,138 B2 | 8/2019 | Gilliland |
| 10,377,373 B2 | 8/2019 | Stettner |
| 10,379,135 B2 | 8/2019 | Maryfield |
| 10,379,205 B2 | 8/2019 | Dussan |
| 10,379,220 B1 | 8/2019 | Smits |
| 10,379,540 B2 | 8/2019 | Droz |
| 10,386,464 B2 | 8/2019 | Dussan |
| 10,386,465 B2 | 8/2019 | Hall |
| 10,386,487 B1 | 8/2019 | Wilton |
| 10,386,488 B2 | 8/2019 | Ridderbusch |
| 10,393,863 B2 | 8/2019 | Sun |
| 10,393,877 B2 | 8/2019 | Hall |
| 10,394,345 B2 | 8/2019 | Donnelly |
| 10,401,480 B1 | 9/2019 | Gaalema |
| 10,401,484 B2 | 9/2019 | Lee |
| 10,401,500 B2 | 9/2019 | Yang |
| 10,401,866 B2 | 9/2019 | Rust |
| 10,408,926 B2 | 9/2019 | Slobodyyabnyuk |
| 10,408,936 B2 | 9/2019 | Van Voorst |

(56) References Cited

U.S. PATENT DOCUMENTS

| | | |
|---|---|---|
| 10,408,939 B1 | 9/2019 | Kim |
| 10,408,940 B2 | 9/2019 | O'Keeffe |
| 10,418,776 B2 | 9/2019 | Welford |
| 10,422,862 B2 | 9/2019 | Gnecchi |
| 10,422,863 B2 | 9/2019 | Choi |
| 10,422,865 B2 | 9/2019 | Irish |
| 10,386,467 B2 | 10/2019 | Dussan |
| 10,429,243 B2 | 10/2019 | Yu |
| 10,429,495 B1 | 10/2019 | Wang |
| 10,429,496 B2 | 10/2019 | Weinberg |
| 10,429,507 B2 | 10/2019 | Sebastian |
| 10,429,511 B2 | 10/2019 | Bosetti |
| 10,430,970 B2 | 10/2019 | Bier |
| 10,436,882 B2 | 10/2019 | Meng |
| 10,436,904 B2 | 10/2019 | Moss |
| 10,436,907 B1 | 10/2019 | Murray |
| 10,444,330 B2 | 10/2019 | Stann |
| 10,444,356 B2 | 10/2019 | Wu |
| 10,444,362 B2 | 10/2019 | Schaefer |
| 10,444,367 B2 | 10/2019 | Lodden |
| 10,445,928 B2 | 10/2019 | Nehmadi |
| 10,447,973 B2 | 10/2019 | Droz |
| 10,451,716 B2 | 10/2019 | Hughes |
| 10,451,740 B2 | 10/2019 | Pei |
| 10,451,742 B2 | 10/2019 | Christmas |
| 10,458,904 B2 | 10/2019 | Batholomew |
| 10,466,342 B1 | 11/2019 | Zhu |
| 10,469,753 B2 | 11/2019 | Yang |
| 10,473,763 B2 | 11/2019 | Schwarz |
| 10,473,767 B2 | 11/2019 | Xiang |
| 10,473,768 B2 | 11/2019 | Walsh |
| 10,473,770 B1 | 11/2019 | Zhu |
| 10,473,784 B2 | 11/2019 | Puglia |
| 10,474,160 B2 | 11/2019 | Huang |
| 10,474,161 B2 | 11/2019 | Huang |
| 10,481,267 B2 | 11/2019 | Wang |
| 10,481,268 B2 | 11/2019 | Vlaiko |
| 10,482,740 B2 | 11/2019 | Fang |
| 10,488,495 B2 | 11/2019 | Sebastian |
| 10,488,496 B2 | 11/2019 | Campbell |
| 10,488,497 B2 | 11/2019 | Cheong |
| 10,491,052 B2 | 11/2019 | Lenius |
| 10,491,855 B2 | 11/2019 | Gates |
| 10,495,757 B2 | 12/2019 | Dussan |
| 10,502,813 B2 | 12/2019 | Schultz |
| 10,503,174 B1 | 12/2019 | Lim |
| 10,503,175 B2 | 12/2019 | Agarwal |
| 10,509,111 B2 | 12/2019 | Park |
| 10,509,112 B1 | 12/2019 | Pan |
| 10,509,120 B2 | 12/2019 | Bilik |
| 10,509,198 B1 | 12/2019 | Zhou |
| 10,514,444 B2 | 12/2019 | Donovan |
| 10,514,447 B2 | 12/2019 | Schwarz |
| 10,520,591 B2 | 12/2019 | Kotelnikov |
| 10,520,592 B2 | 12/2019 | Droz |
| 10,520,602 B2 | 12/2019 | Villeneuve |
| 10,523,880 B2 | 12/2019 | Gassend |
| 10,527,726 B2 | 1/2020 | Bartlett |
| 10,531,004 B2 | 1/2020 | Wheeler |
| 10,534,074 B2 | 1/2020 | Slobodyyanyuk |
| 10,534,079 B2 | 1/2020 | Kim |
| 10,539,116 B2 | 1/2020 | Davoust |
| 10,539,661 B2 | 1/2020 | Hall |
| 10,539,663 B2 | 1/2020 | Liu |
| 10,545,222 B2 | 1/2020 | Hall |
| 10,545,238 B1 | 1/2020 | Rezk |
| 10,545,240 B2 | 1/2020 | Campbell |
| 10,545,289 B1 | 1/2020 | Chriqui |
| 10,552,691 B2 | 2/2020 | Li |
| 10,556,585 B1 | 2/2020 | Berger |
| 10,557,923 B2 | 2/2020 | Watnik |
| 10,557,924 B1 | 2/2020 | Jang |
| 10,557,926 B2 | 2/2020 | Gilliland |
| 10,557,927 B2 | 2/2020 | Marron |
| 10,557,929 B2 | 2/2020 | Kajiyama |
| 10,557,939 B2 | 2/2020 | Campbell |
| 10,557,940 B2 | 2/2020 | Eichenholz |
| 10,557,942 B2 | 2/2020 | Belsey |
| 10,564,261 B2 | 2/2020 | Huebner |
| 10,564,263 B2 | 2/2020 | Efimov |
| 10,564,266 B2 | 2/2020 | O'Keeffe |
| 10,564,285 B2 | 2/2020 | Belsley |
| 10,565,457 B2 | 2/2020 | Luo |
| 10,571,552 B1 | 2/2020 | Gao |
| 10,571,567 B2 | 2/2020 | Campbell |
| 10,571,570 B1 | 2/2020 | Paulsen |
| 10,571,574 B1 | 2/2020 | Yavid |
| 10,571,683 B2 | 2/2020 | Low |
| 10,576,011 B1 | 3/2020 | Krishnan |
| 10,578,717 B2 | 3/2020 | Bucina |
| 10,578,719 B2 | 3/2020 | O'Keeffe |
| 10,578,720 B2 | 3/2020 | Hughes |
| 10,578,721 B2 | 3/2020 | Jang |
| 10,578,724 B2 | 3/2020 | Droz |
| 10,578,742 B2 | 3/2020 | Guo |
| 10,585,174 B2 | 3/2020 | Gnecchi |
| 10,585,175 B2 | 3/2020 | Reterath |
| 10,591,598 B2 | 3/2020 | Jeong |
| 10,591,599 B2 | 3/2020 | O'keeffe |
| 10,591,600 B2 | 3/2020 | Villeneuve |
| 10,591,601 B2 | 3/2020 | Hicks |
| 10,591,604 B2 | 3/2020 | Xu |
| 10,591,740 B2 | 3/2020 | McMichael |
| 10,598,769 B2 | 3/2020 | Rodrigo |
| 10,598,770 B2 | 3/2020 | Singer |
| 10,598,788 B1 | 3/2020 | Dussan |
| 10,598,791 B2 | 3/2020 | Jain |
| 10,598,922 B2 | 3/2020 | Low |
| 10,600,930 B2 | 3/2020 | Suzuki |
| 10,605,899 B2 | 3/2020 | Singer |
| 10,605,900 B2 | 3/2020 | Spuler |
| 10,605,918 B2 | 3/2020 | Wong |
| 10,605,924 B2 | 3/2020 | Slutsky |
| RE47,942 E | 4/2020 | Hall |
| D882,430 S | 4/2020 | Haban |
| 10,551,501 B1 | 4/2020 | LaChapelle |
| 10,613,200 B2 | 4/2020 | Hallstig |
| 10,613,201 B2 | 4/2020 | Pacala |
| 10,613,204 B2 | 4/2020 | Warke |
| 10,613,224 B2 | 4/2020 | Jeong |
| 10,620,301 B2 | 4/2020 | Wilton |
| 10,620,302 B2 | 4/2020 | Zhu |
| 10,620,315 B2 | 4/2020 | Zellinger |
| 10,620,317 B1 | 4/2020 | Chai |
| 10,620,318 B2 | 4/2020 | Yi |
| 10,627,490 B2 | 4/2020 | Hall |
| 10,627,491 B2 | 4/2020 | Hall |
| 10,627,492 B2 | 4/2020 | Shand |
| 10,627,495 B2 | 4/2020 | Gaalema |
| 10,627,512 B1 | 4/2020 | Hicks |
| 10,627,516 B2 | 4/2020 | Eichenholz |
| 10,629,072 B2 | 4/2020 | Felix |
| 10,630,913 B2 | 4/2020 | Wei |
| 10,634,772 B2 | 4/2020 | Eckstein |
| 10,634,793 B1 | 4/2020 | Siao |
| 10,641,870 B1 | 5/2020 | Magnani |
| 10,641,872 B2 | 5/2020 | Dussan |
| 10,641,873 B2 | 5/2020 | Dussan |
| 10,641,874 B2 | 5/2020 | Campbell |
| 10,641,876 B2 | 5/2020 | Field |
| 10,641,877 B2 | 5/2020 | Lombrozo |
| 10,641,878 B2 | 5/2020 | Yeo |
| 10,641,897 B1 | 5/2020 | Dussan |
| 10,641,900 B2 | 5/2020 | Dussan |
| 10,642,029 B2 | 5/2020 | Dussan |
| 10,649,072 B2 | 5/2020 | Bozchalooi |
| 10,649,086 B2 | 5/2020 | Raring |
| 10,650,531 B2 | 5/2020 | Lakshmi Narayanan |
| 10,656,252 B1 | 5/2020 | Dussan |
| 10,656,272 B1 | 5/2020 | Dussan |
| 10,656,277 B1 | 5/2020 | Dussan |
| 10,663,584 B2 | 5/2020 | Sakai |
| 10,663,587 B1 | 5/2020 | Sandborn |
| 10,663,590 B2 | 5/2020 | Rzeszutek |

(56) References Cited

U.S. PATENT DOCUMENTS

| | | |
|---|---|---|
| 10,663,596 B2 | 5/2020 | Dussan |
| RE48,042 E | 6/2020 | Pennecot |
| 10,670,460 B1 | 6/2020 | Waterbury |
| 10,670,702 B2 | 6/2020 | Choi |
| 10,670,718 B1 | 6/2020 | Dussan |
| 10,670,721 B2 | 6/2020 | Efimov |
| 10,670,724 B2 | 6/2020 | Moon |
| 10,677,897 B2 | 6/2020 | LaChapelle |
| 10,677,925 B2 | 6/2020 | Boehmke |
| 10,684,359 B2 | 6/2020 | Axelsson |
| 10,684,360 B2 | 6/2020 | Campbell |
| 10,690,754 B2 | 6/2020 | Pei |
| 10,690,756 B2 | 6/2020 | Warke |
| 10,690,772 B2 | 6/2020 | Van Voorst |
| 10,697,582 B2 | 6/2020 | Campbell |
| 10,698,088 B2 | 6/2020 | Droz |
| 10,698,114 B2 | 6/2020 | Keilaf |
| 10,705,189 B2 | 7/2020 | Qiu |
| 10,705,190 B2 | 7/2020 | Jang |
| 10,712,433 B2 | 7/2020 | Carothers |
| 10,712,434 B2 | 7/2020 | Hall |
| 10,714,889 B2 | 7/2020 | Hong |
| 10,725,156 B2 | 7/2020 | Halmos |
| 10,725,177 B2 | 7/2020 | Smits |
| 10,726,567 B2 | 7/2020 | Lee |
| 10,726,579 B1 | 7/2020 | Huang |
| 10,732,264 B2 | 8/2020 | Bailey |
| 10,732,266 B2 | 8/2020 | Popovich |
| 10,732,279 B2 | 8/2020 | Schlotterbeck |
| 10,732,281 B2 | 8/2020 | LaChapelle |
| 10,732,287 B2 | 8/2020 | Korsgard Jensen |
| 10,739,440 B2 | 8/2020 | Shimizu |
| 10,739,441 B2 | 8/2020 | Nabbe |
| 10,739,444 B2 | 8/2020 | Hall |
| 10,739,459 B2 | 8/2020 | Castorena Martinez |
| 10,739,461 B2 | 8/2020 | Agarwal |
| 10,746,858 B2 | 8/2020 | Bradley |
| 10,754,009 B2 | 8/2020 | Sung |
| 10,754,012 B2 | 8/2020 | Galloway |
| 10,754,033 B2 | 8/2020 | Shand |
| 10,754,034 B1 | 8/2020 | Chamberlain |
| 10,761,191 B2 | 9/2020 | Qiu |
| 10,761,195 B2 | 9/2020 | Donovan |
| 10,761,196 B2 | 9/2020 | Dussan |
| 10,762,673 B2 | 9/2020 | Luo |
| 10,763,290 B2 | 9/2020 | Akselrod |
| 10,768,282 B2 | 9/2020 | Crouch |
| 10,768,303 B2 | 9/2020 | Xiong |
| 10,775,484 B2 | 9/2020 | Jeong |
| 10,775,485 B2 | 9/2020 | Shim |
| 10,775,488 B2 | 9/2020 | Bradley |
| 10,775,507 B2 | 9/2020 | Mandai |
| 10,782,393 B2 | 9/2020 | Dussan |
| 10,782,399 B2 | 9/2020 | Lee |
| 10,782,409 B2 | 9/2020 | Wang |
| 10,788,574 B2 | 9/2020 | Shim |
| 10,732,283 B2 | 10/2020 | Gilliland |
| 10,754,015 B2 | 10/2020 | Dussan |
| 10,791,884 B2 | 10/2020 | Starkey |
| 10,794,998 B2 | 10/2020 | Spuler |
| 10,795,000 B2 | 10/2020 | Singer |
| 10,796,457 B2 | 10/2020 | Beek |
| 10,802,119 B2 | 10/2020 | Yoon |
| 10,802,120 B1 | 10/2020 | LaChapelle |
| 10,802,122 B1 | 10/2020 | Goldberg |
| 10,802,149 B2 | 10/2020 | Stettner |
| 10,809,361 B2 | 10/2020 | Vallespi-Gonzalez |
| 10,809,362 B2 | 10/2020 | Fredericksen |
| 10,809,380 B2 | 10/2020 | Pacala |
| 10,816,647 B2 | 10/2020 | Xiang |
| 10,816,648 B2 | 10/2020 | Pennecot |
| 10,816,649 B1 | 10/2020 | Keyser |
| 10,818,091 B2 | 10/2020 | Evans |
| 10,819,082 B2 | 10/2020 | Josset |
| 10,821,942 B2 | 11/2020 | Green |
| 10,823,855 B2 | 11/2020 | Li |
| 10,830,877 B1 | 11/2020 | Chawla |
| 10,830,878 B2 | 11/2020 | McMichael |
| 10,830,880 B2 | 11/2020 | Subasingha |
| 10,830,890 B1 | 11/2020 | Keyser |
| 10,837,773 B2 | 11/2020 | Yang |
| 10,838,042 B2 | 11/2020 | Badoni |
| 10,838,045 B2 | 11/2020 | Crouch |
| 10,838,046 B2 | 11/2020 | Qui |
| 10,838,047 B2 | 11/2020 | Chong |
| 10,838,048 B2 | 11/2020 | Field |
| 10,838,049 B1 | 11/2020 | Schwiesow |
| 10,838,062 B2 | 11/2020 | de Mersseman |
| 10,841,496 B2 | 11/2020 | Wheeler |
| 10,844,838 B2 | 11/2020 | Schlipf |
| 10,845,464 B2 | 11/2020 | Schwarz |
| 10,845,466 B2 | 11/2020 | Pei |
| 10,845,468 B2 | 11/2020 | Marron |
| 10,845,470 B2 | 11/2020 | Verghese |
| 10,845,480 B1 | 11/2020 | Shah |
| 10,845,482 B2 | 11/2020 | Frederiksen |
| 10,845,587 B2 | 11/2020 | Low |
| 10,852,397 B2 | 12/2020 | Schwarz |
| 10,852,398 B2 | 12/2020 | Yu |
| 10,852,426 B2 | 12/2020 | Shan |
| 10,852,433 B2 | 12/2020 | Chen |
| 10,852,437 B2 | 12/2020 | Eken |
| 10,852,438 B2 | 12/2020 | Hartman |
| 10,859,683 B2 | 12/2020 | Lin |
| 10,859,684 B1 | 12/2020 | Nabatchian |
| 10,866,312 B2 | 12/2020 | Crouch |
| 10,866,319 B2 | 12/2020 | Brinkmeyer |
| 10,871,554 B1 | 12/2020 | Keyser |
| 10,871,779 B2 | 12/2020 | Templeton |
| 10,872,269 B2 | 12/2020 | Roy Chowdhury |
| 10,877,131 B2 | 12/2020 | Singer |
| 10,877,134 B2 | 12/2020 | Han |
| 10,877,154 B2 | 12/2020 | Bronstein |
| 10,878,282 B2 | 12/2020 | Mei |
| 10,878,580 B2 | 12/2020 | Mei |
| 10,879,415 B2 | 12/2020 | Kwon |
| 10,884,126 B2 | 1/2021 | Shu |
| 10,884,129 B2 | 1/2021 | Wu |
| 10,884,130 B1 | 1/2021 | Viswanatha |
| 10,884,131 B1 | 1/2021 | Allais |
| 10,884,411 B1 | 1/2021 | Allais |
| 10,890,650 B2 | 1/2021 | Droz |
| 10,891,744 B1 | 1/2021 | Wyffels |
| 10,897,575 B2 | 1/2021 | Wheeler |
| 10,901,074 B1 | 1/2021 | Pan |
| 10,901,089 B2 | 1/2021 | Zhang |
| 10,901,292 B2 | 1/2021 | Jeong |
| D909,216 S | 2/2021 | Vuletici |
| 10,908,080 B2 | 2/2021 | Salazar |
| 10,908,262 B2 | 2/2021 | Dussan |
| 10,908,264 B2 | 2/2021 | O'Keeffe |
| 10,908,265 B2 | 2/2021 | Dussan |
| 10,908,267 B1 | 2/2021 | Gagne |
| 10,908,268 B2 | 2/2021 | Zhou |
| 10,908,282 B2 | 2/2021 | Meyers |
| 10,908,287 B2 | 2/2021 | Warke |
| 10,908,372 B2 | 2/2021 | Moebius |
| 10,908,409 B2 | 2/2021 | Zhou |
| 10,914,821 B2 | 2/2021 | Patterson |
| 10,914,822 B2 | 2/2021 | Kremer |
| 10,914,824 B2 | 2/2021 | Meng |
| 10,914,825 B2 | 2/2021 | Coda |
| 10,914,839 B2 | 2/2021 | Hartmann |
| 10,914,841 B2 | 2/2021 | Crouch |
| 10,921,431 B2 | 2/2021 | Pei |
| 10,921,450 B2 | 2/2021 | Dussan |
| 10,921,452 B2 | 2/2021 | Crouch |
| 10,921,453 B2 | 2/2021 | Dumais |
| 10,922,880 B2 | 2/2021 | Scanlon |
| 10,928,485 B1 | 2/2021 | Karadeniz |
| 10,928,486 B2 | 2/2021 | Donovan |
| 10,928,487 B2 | 2/2021 | O'Keeffe |
| 10,928,488 B2 | 2/2021 | Sun |
| 10,928,490 B2 | 2/2021 | Tatipamula |

(56) References Cited

U.S. PATENT DOCUMENTS

| | | | |
|---|---|---|---|
| 10,928,519 B2 | 2/2021 | Schaffner |
| 10,929,694 B1 | 2/2021 | Zhang |
| RE48,490 E | 3/2021 | Hall |
| RE48,491 E | 3/2021 | Hall |
| 10,935,637 B2 | 3/2021 | Cullumber |
| 10,935,640 B2 | 3/2021 | Jackson |
| 10,935,658 B2 | 3/2021 | Park |
| 10,935,659 B2 | 3/2021 | Smits |
| 10,939,057 B2 | 3/2021 | Gassend |
| 10,942,257 B2 | 3/2021 | Bao |
| 10,942,260 B2 | 3/2021 | Low |
| 10,942,272 B2 | 3/2021 | Droz |
| 10,942,277 B1 | 3/2021 | Angus |
| 10,948,598 B1 | 3/2021 | Prabhakar |
| 10,951,864 B2 | 3/2021 | Droz |
| 10,955,530 B2 | 3/2021 | Pei |
| 10,955,532 B2 | 3/2021 | Gilliland |
| 10,955,533 B2 | 3/2021 | Konrad |
| 10,955,534 B2 | 3/2021 | Halmos |
| 10,955,545 B1 | 3/2021 | Hunt |
| 10,955,952 B2 | 3/2021 | Gwon |
| 10,962,644 B1 | 3/2021 | Kong |
| 10,962,647 B2 | 3/2021 | Shin |
| 10,965,379 B2 | 3/2021 | Brown |
| RE48,503 E | 4/2021 | Hall |
| RE48,504 E | 4/2021 | Hall |
| 10,969,474 B2 | 4/2021 | O'Keeffe |
| 10,969,475 B2 | 4/2021 | Li |
| 10,969,489 B2 | 4/2021 | Schmitt |
| 10,976,413 B2 | 4/2021 | Han |
| 10,976,414 B2 | 4/2021 | Sayyah |
| 10,976,417 B2 | 4/2021 | LaChapelle |
| 10,979,644 B2 | 4/2021 | Jamjoom |
| 10,983,197 B1 | 4/2021 | Zhu |
| 10,983,201 B2 | 4/2021 | Pimentel |
| 10,983,213 B2 | 4/2021 | Eichenholz |
| 10,983,215 B2 | 4/2021 | Li |
| 10,983,218 B2 | 4/2021 | Hall |
| 10,983,219 B2 | 4/2021 | Kotov |
| 10,984,540 B2 | 4/2021 | Mei |
| 10,989,796 B2 | 4/2021 | Liu |
| 10,989,914 B2 | 4/2021 | Ramsey |
| 10,996,322 B2 | 5/2021 | Buettner |
| 10,996,334 B2 | 5/2021 | Datta |
| 10,999,511 B2 | 5/2021 | Yang |
| 11,002,832 B2 | 5/2021 | Sayyah |
| 11,002,834 B2 | 5/2021 | Kaestner |
| 11,002,837 B2 | 5/2021 | Barber |
| 11,002,839 B2 | 5/2021 | Shi |
| 11,002,852 B2 | 5/2021 | Cao |
| 11,002,853 B2 | 5/2021 | McWhirter |
| 11,002,857 B2 | 5/2021 | Dussan |
| 11,003,137 B2 | 5/2021 | Christmas |
| 11,009,592 B2 | 5/2021 | Wilton |
| 11,009,605 B2 | 5/2021 | Li |
| 11,016,178 B2 | 5/2021 | Donovan |
| 11,016,181 B2 | 5/2021 | Schwarz |
| 11,016,183 B2 | 5/2021 | Gill |
| 11,016,195 B2 | 5/2021 | Margallo Balbas |
| 11,016,197 B1 | 5/2021 | Barber |
| 11,016,496 B2 | 5/2021 | Chen |
| 11,022,682 B2 | 6/2021 | Konrad |
| 11,022,688 B2 | 6/2021 | Eichenholz |
| 11,022,689 B2 | 6/2021 | Villeneuve |
| 11,022,691 B2 | 6/2021 | Frederiksen |
| 11,022,693 B1 | 6/2021 | Allais |
| 11,024,669 B2 | 6/2021 | Rezk |
| 11,027,726 B2 | 6/2021 | Stettner |
| 11,029,393 B2 | 6/2021 | Li |
| 11,029,394 B2 | 6/2021 | Li |
| 11,029,395 B1 | 6/2021 | Barber |
| 11,029,398 B2 | 6/2021 | Hwang |
| 11,029,406 B2 | 6/2021 | LaChapelle |
| 11,035,933 B2 | 6/2021 | Demir |
| 11,035,957 B2 | 6/2021 | Shotan |
| 11,041,942 B2 | 6/2021 | Ruchatz |
| 11,041,944 B2 | 6/2021 | Zhu |
| 11,041,954 B2 | 6/2021 | Crouch |
| 11,041,956 B2 | 6/2021 | Harris |
| 11,041,957 B2 | 6/2021 | Uehara |
| 11,043,005 B2 | 6/2021 | Wallin |
| 11,047,958 B1 | 6/2021 | Choiniere |
| 11,047,963 B1 | 6/2021 | Viswanatha |
| 11,047,983 B1 | 6/2021 | Prabhakar |
| 11,054,505 B2 | 7/2021 | Droz |
| 11,054,508 B2 | 7/2021 | Li |
| 11,054,523 B1 | 7/2021 | Buchter |
| 11,054,524 B2 | 7/2021 | Rezk |
| 11,061,116 B2 | 7/2021 | Gao |
| 11,061,140 B2 | 7/2021 | Hosseini |
| 11,063,408 B2 | 7/2021 | Jang |
| 11,067,670 B2 | 7/2021 | Patterson |
| 11,067,671 B2 | 7/2021 | Chong |
| 11,067,673 B2 | 7/2021 | Wei |
| 11,067,676 B2 | 7/2021 | Yang |
| 11,067,693 B2 | 7/2021 | Walls |
| 11,119,218 B2 | 9/2021 | Patterson |
| 11,150,349 B2 | 10/2021 | Chen |
| 11,556,000 B1 * | 1/2023 | Goldman ............ G02B 26/0858 |
| 2002/0140294 A1 | 10/2002 | Iwata |
| 2005/0173770 A1 | 8/2005 | Linden et al. |
| 2007/0035624 A1 | 2/2007 | Lubard |
| 2009/0273770 A1 | 11/2009 | Bauhahn |
| 2010/0053715 A1 | 3/2010 | O'Neil |
| 2010/0204974 A1 | 8/2010 | Israelsen |
| 2012/0170024 A1 | 7/2012 | Azzazy |
| 2012/0170029 A1 | 7/2012 | Azzazy |
| 2012/0236379 A1 | 9/2012 | DaSilva |
| 2013/0120734 A1 | 5/2013 | Ogata |
| 2013/0242283 A1 | 9/2013 | Bailey |
| 2015/0192677 A1 | 7/2015 | Yu |
| 2015/0301180 A1 | 10/2015 | Stettner |
| 2015/0329111 A1 | 11/2015 | Prokhorov |
| 2016/0162743 A1 | 6/2016 | Chundrlik |
| 2017/0328990 A1 | 11/2017 | Magee |
| 2020/0101890 A1 | 4/2020 | Solar |

FOREIGN PATENT DOCUMENTS

| | | |
|---|---|---|
| CN | 2681085 Y | 2/2006 |
| CN | 2773714 Y | 4/2006 |
| CN | 103278808 B | 12/2015 |
| CN | 104299244 B | 7/2017 |
| CN | 206773192 U | 12/2017 |
| CN | 106443699 B | 2/2019 |
| CN | 106597471 B | 5/2019 |
| CN | 208902906 U | 5/2019 |
| CN | 109997057 B | 7/2020 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |
| DE | 3808972 A1 | 10/1989 |
| DE | 3821892 C1 | 2/1990 |
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |

(56) References Cited

FOREIGN PATENT DOCUMENTS

| | | |
|---|---|---|
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 102007044536 A1 | 3/2009 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298454 A2 | 4/2003 |
| EP | 1298543 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |
| EP | 1557693 A1 | 7/2005 |
| EP | 1557694 A1 | 7/2005 |
| EP | 1557992 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1965225 | 9/2008 |
| EP | 1983354 A1 | 10/2008 |
| EP | 2003471 A1 | 12/2008 |
| EP | 2177931 A2 | 4/2010 |
| EP | 2503360 A1 | 9/2012 |
| EP | 2631667 | 8/2013 |
| EP | 2994772 | 3/2016 |
| EP | 3029488 | 6/2016 |
| EP | 2122599 B1 | 11/2019 |
| EP | 3671261 A1 | 6/2020 |
| GB | 2041687 A | 9/1980 |
| GB | 2251150 A | 6/1992 |
| GB | 2463815 | 3/2010 |
| JP | H36407 | 1/1991 |
| JP | H05240940 A | 9/1993 |
| JP | H6288725 | 10/1994 |
| JP | 2011264871 | 9/1999 |
| JP | 2001216592 | 8/2001 |
| JP | 20012656576 | 9/2001 |
| JP | 2009086787 A | 4/2009 |
| JP | 6039704 B2 | 12/2016 |
| JP | 2017162204 A | 9/2017 |
| JP | 2020521955 A | 7/2020 |
| RU | 2480712 | 4/2013 |
| WO | WO1999/003080 A1 | 1/1999 |
| WO | WO2000/025089 A1 | 5/2000 |
| WO | WO01/31608 A1 | 5/2001 |
| WO | WO03/019234 A1 | 3/2003 |
| WO | WO03/040755 A2 | 5/2003 |
| WO | WO2004/019293 A2 | 3/2004 |
| WO | WO2004/036245 A2 | 4/2004 |
| WO | WO2008008970 A2 | 1/2008 |
| WO | WO2009/120706 A2 | 10/2009 |
| WO | WO2010141631 A1 | 12/2010 |
| WO | WO2015/079300 A1 | 6/2015 |
| WO | WO2015/104572 A1 | 7/2015 |
| WO | WO2016/162568 A1 | 10/2016 |
| WO | WO2017/033419 A1 | 3/2017 |
| WO | WO2017/089063 A1 | 6/2017 |
| WO | WO2017/132703 A1 | 8/2017 |
| WO | WO2017/164989 A1 | 9/2017 |
| WO | WO2017/165316 A1 | 9/2017 |
| WO | WO2017/193269 A1 | 11/2017 |
| WO | WO2018/125823 A1 | 7/2018 |
| WO | WO2018/196001 A1 | 11/2018 |

* cited by examiner

FIGURE 1 - PRIOR ART

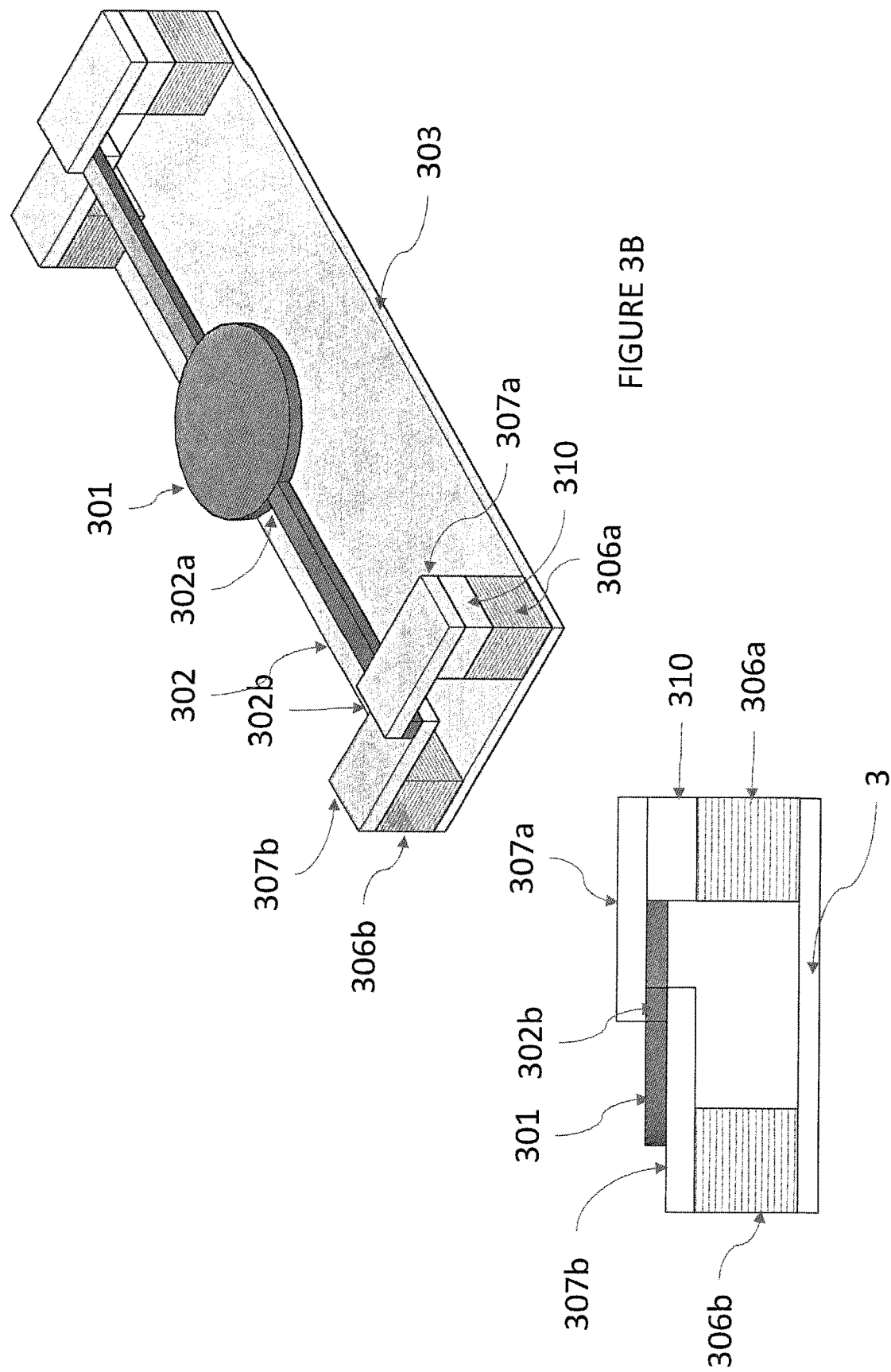

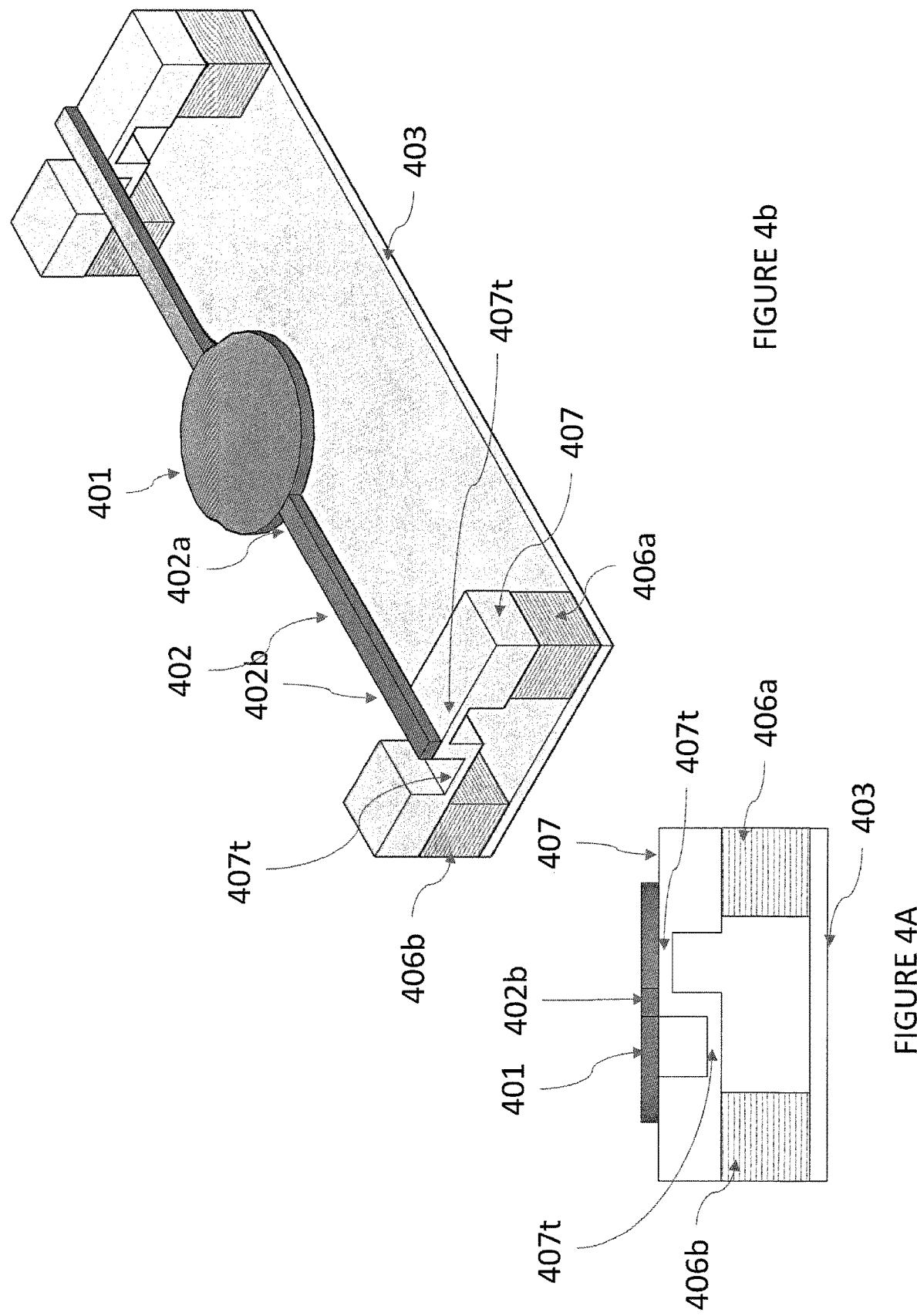

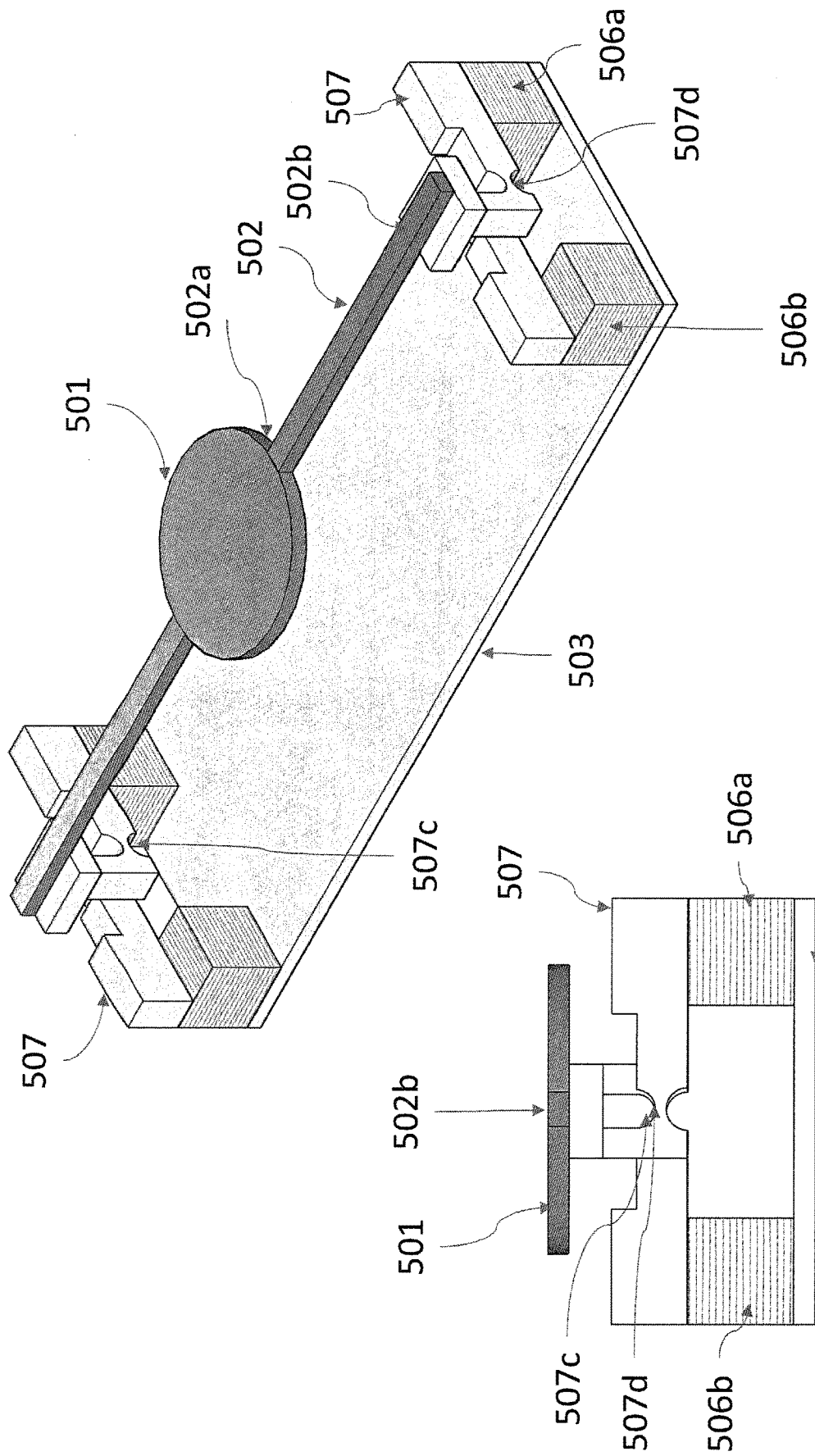

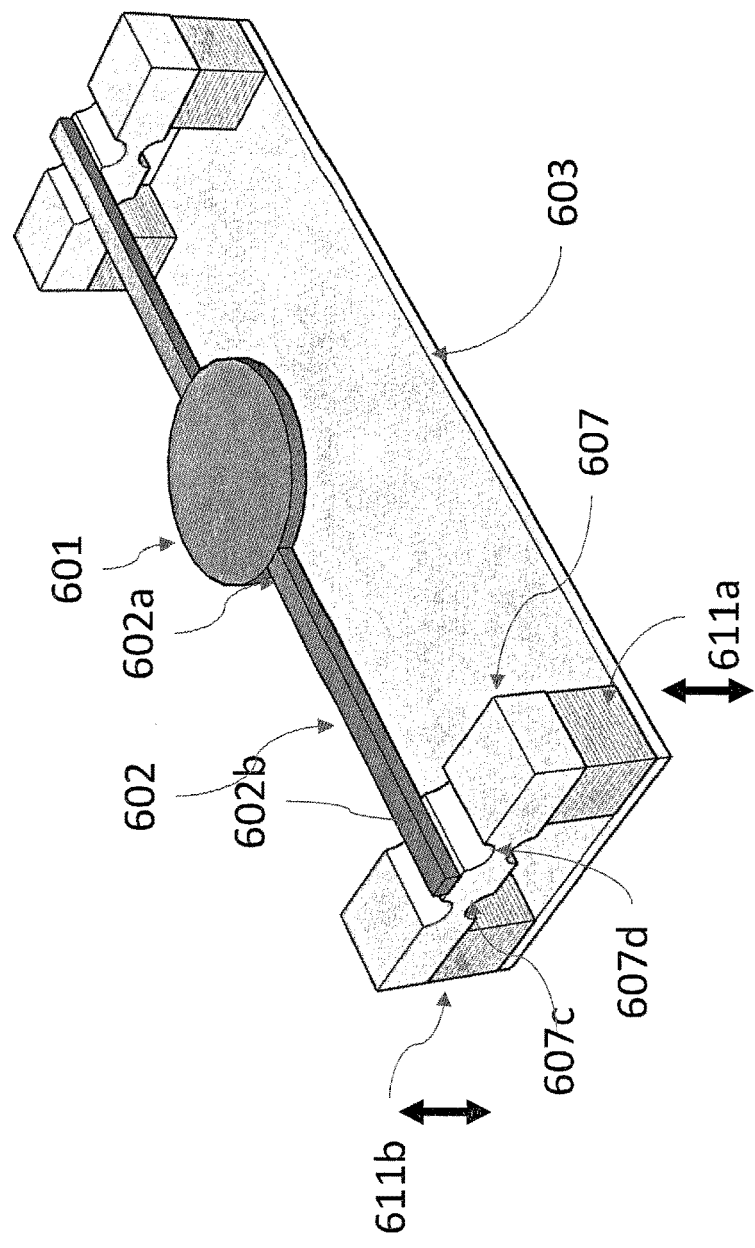
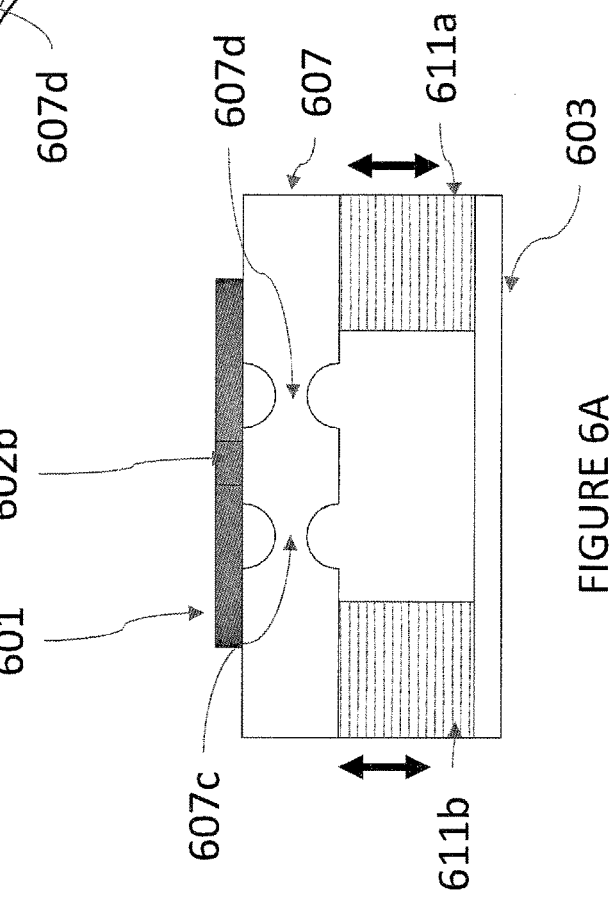
FIGURE 6B
FIGURE 6A

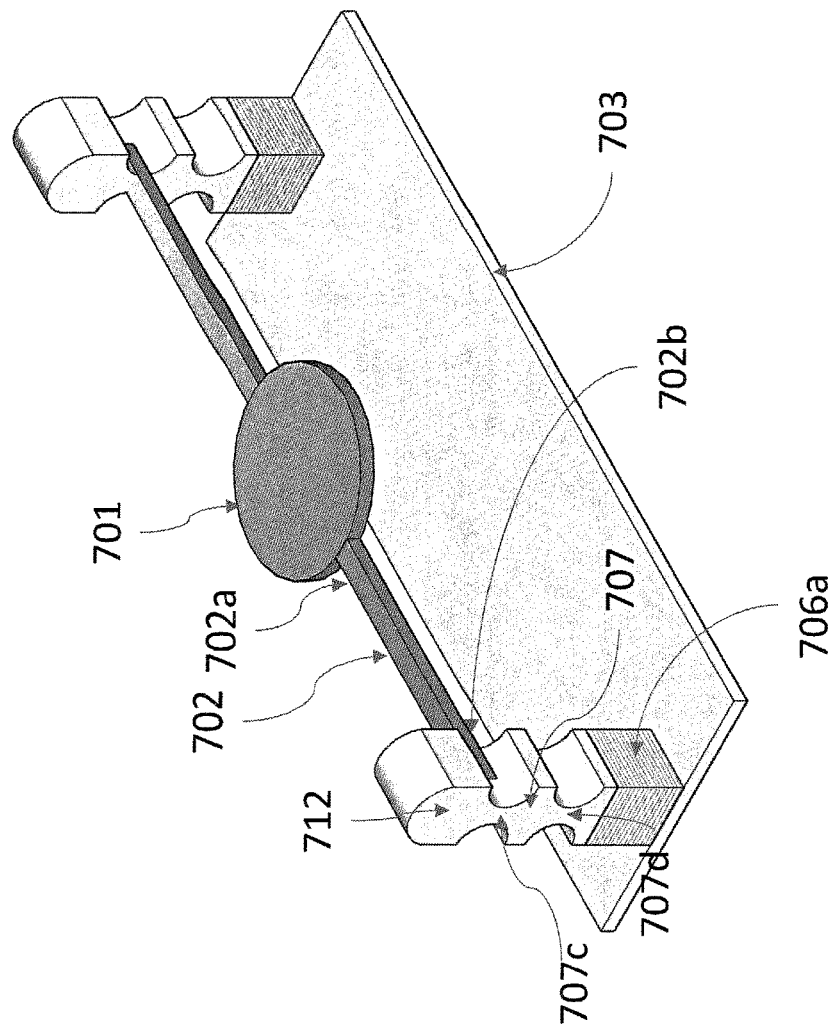
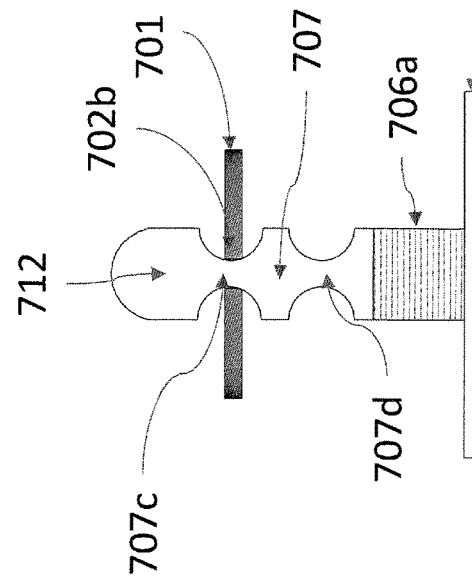
FIGURE 7B
FIGURE 7A

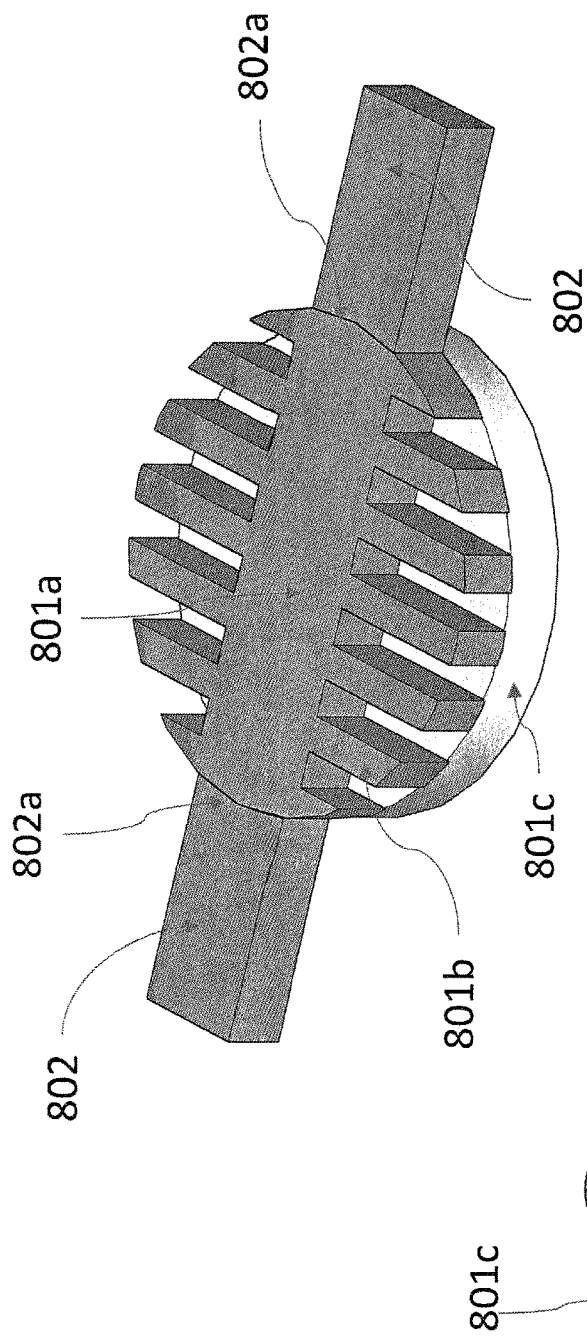
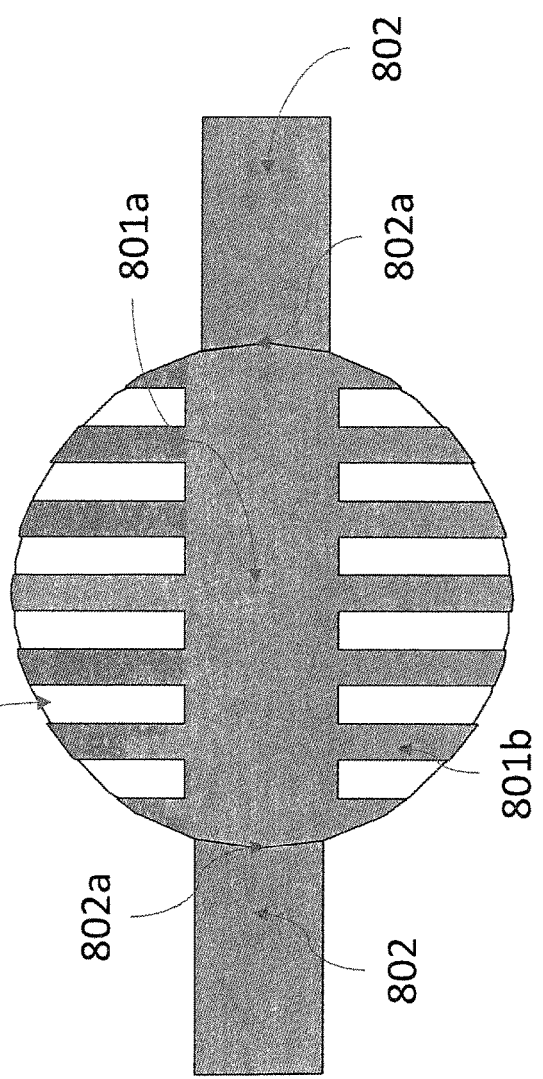
FIGURE 8B
FIGURE 8A

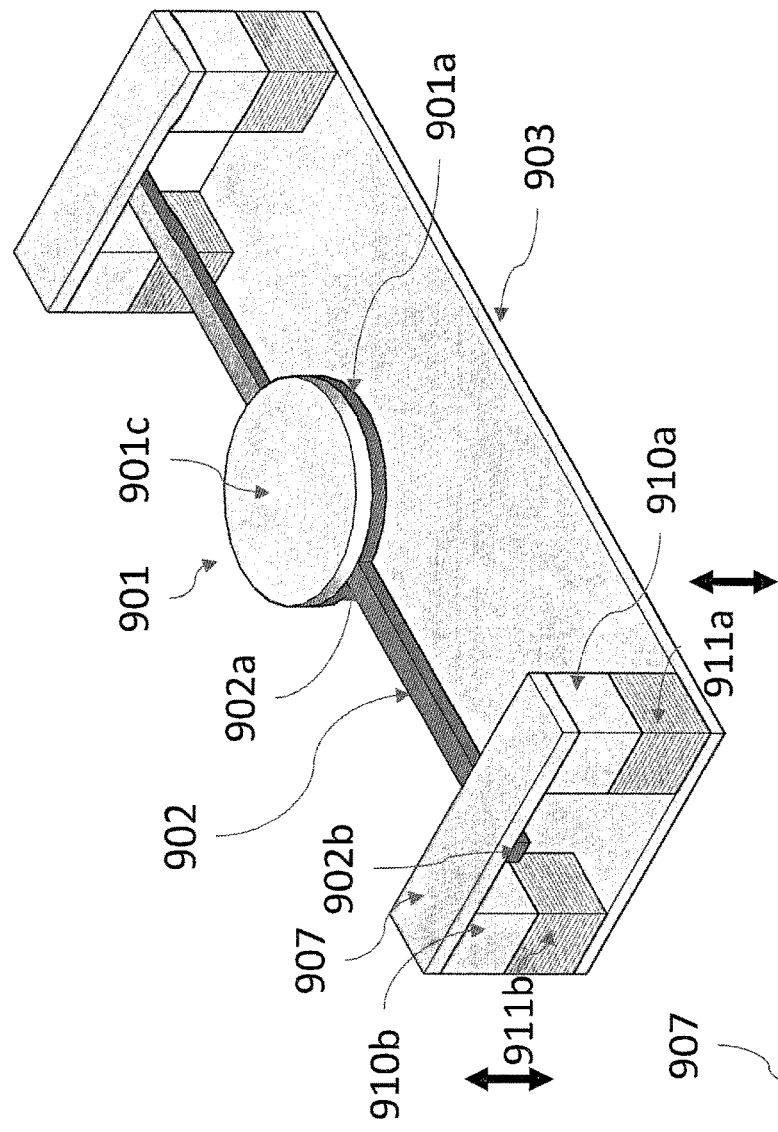
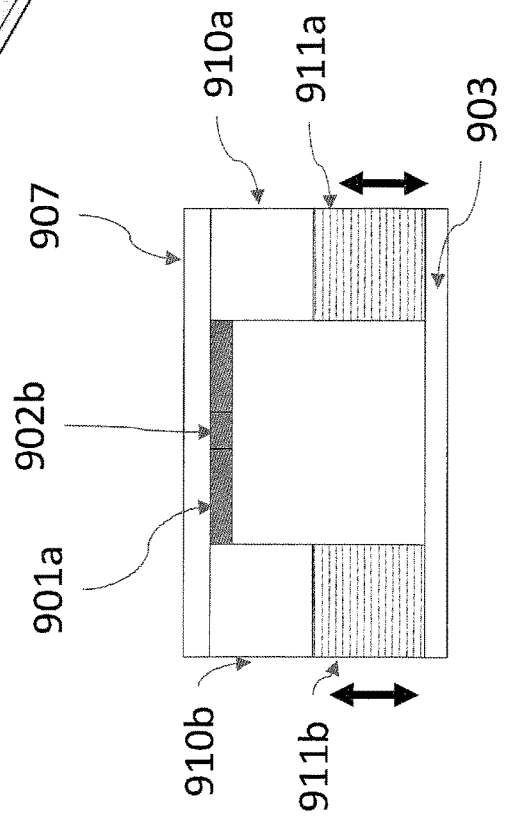
FIGURE 9b
FIGURE 9A

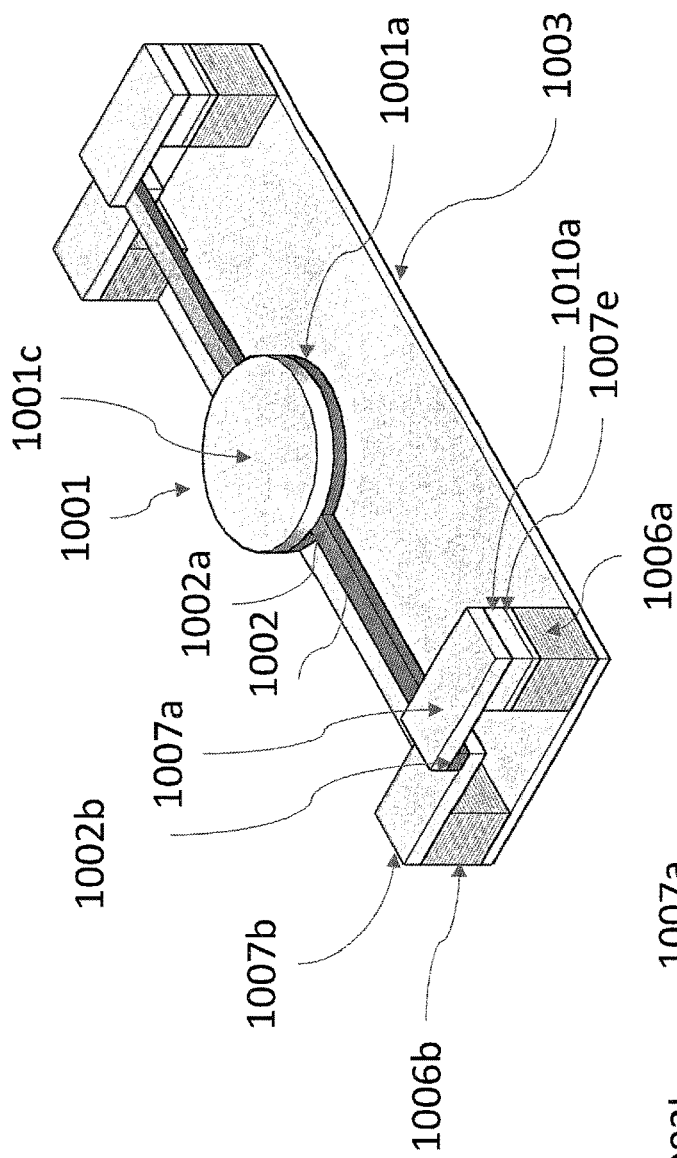
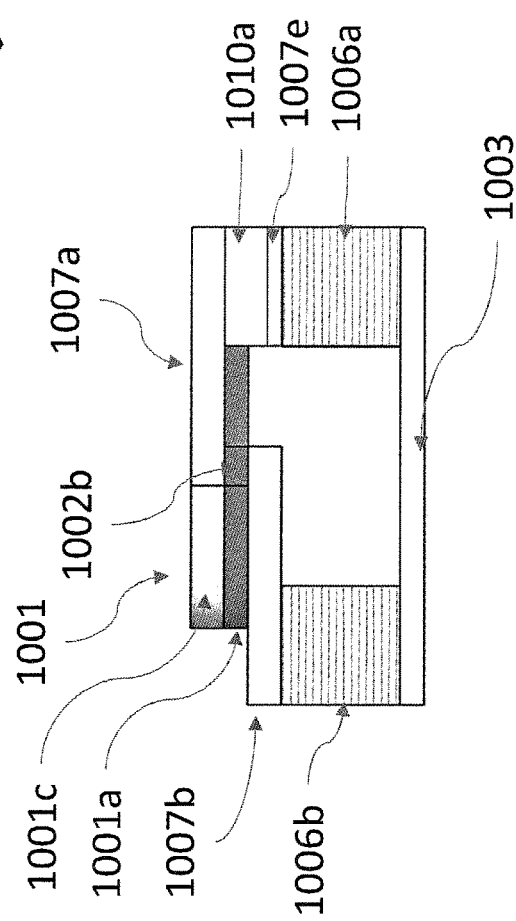
FIGURE 10B
FIGURE 10A

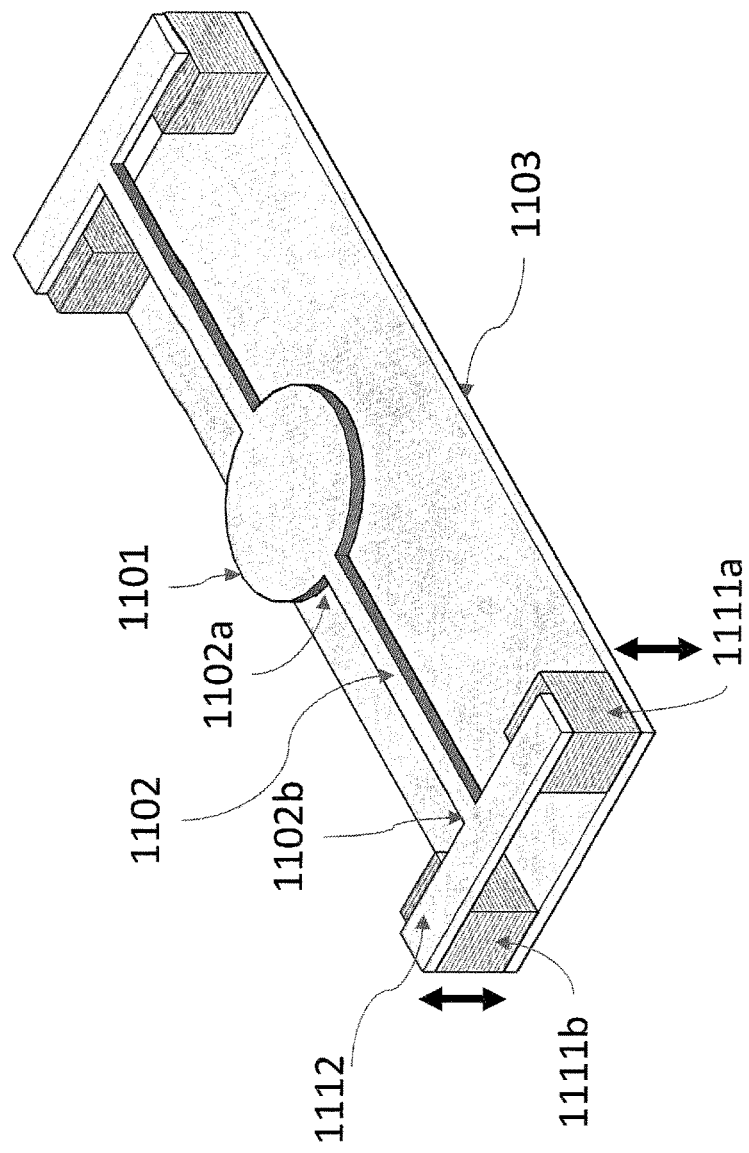
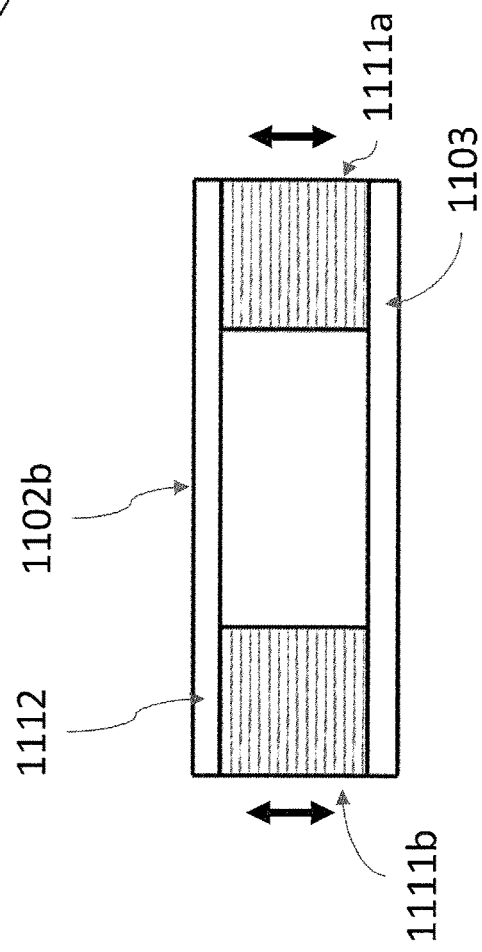
FIGURE 11B
FIGURE 11A

DISTALLY ACTUATED SCANNING MIRROR

CROSS REFERENCES TO RELATED APPLICATIONS

This application is a continuation of U.S. patent application Ser. No. 17/000,464, filed on Aug. 22, 2019, now issued as U.S. Pat. No. 11,556,000, which claims priority on U.S. Provisional Application Ser. No. 62/890,189, filed on Aug. 22, 2019, all disclosures of which are incorporated herein by reference.

FIELD OF THE INVENTION

The present invention relates generally to the field of laser beam scanning, and more specifically, to resonant, high-frequency, wide-angle scanning, suitable for a fast stage of 2D raster scanners.

BACKGROUND OF THE INVENTION

The advent of lasers producing thin, highly-collimated beams of light demanded development of special means to direct those beams in desired direction, an angularly-movable mirror being the simplest of such means. Reflecting a beam from two mirrors with orthogonal directions of rotation enables the creation of a 2D pattern of laser light on the target surface. While most applications are satisfied with vector patterns, and, respectively, relatively slow mirrors, some applications, such as laser projectors and LIDARs, require raster scanning, and very fast mirrors for at least one of the two directions.

Almost without exception, fast scanning mirror are resonant, consisting of the mirror itself suspended on some form of torsional hinge, and capable of torsional oscillations with the frequency defined by the mirror inertia and the spring rate of the hinge. Frequencies in excess of 20 kHz, and total optical scan angles of the order of 1 radian have been achieved by mirrors of ~1 mm in diameter. Silicon MEMS (Micro-Electro-Mechanical System) technology has become dominant in fabrication of the fast scanning mirrors.

A typical MEMS scanning mirror, as shown on FIG. 1, consists of the mirror block 101, typically of round or oval or rectangular shape, with the reflective surface on one side, and two torsional hinges 102, with proximal ends 102a rigidly attached to the mirror block, and distal ends 102b rigidly attached to a base. The mirror block 101 carries some elements of the actuator, such as permanent magnets, coils, or electrodes, whereas the other parts of the actuator are mounted to the base. For illustrative purposes, the permanent magnet 104 is shown attached to the mirror block 101, while the coil 105 is stationary. The magnetic interaction between the magnet 104 and the coil 105 creates torque acting on the mirror block 101, and if the frequency of this torque equals the mechanical resonant frequency of the mirror block 101 on the torsion hinges 102, the mirror block 101 would reach large scan angles.

However, actuation to large scan angles requires considerable force and considerable amount of mechanical energy, which grow rapidly with the increase of the mirror block 101 size, frequency and scan angle. Provision of such force and energy necessitate increasing the size of the elements of the actuator, including those attached to the mirror block, such as permanent magnet 104, which in turns increases the mirror block's 101 inertia, and requiring even more actuation energy.

OBJECTS OF THE INVENTION

The present invention is aimed at overcoming the limitations of the existing scanning mirrors and enabling high-resolution, high-frame-rate raster scanning for laser projection and LIDAR applications. More specifically, these aims are:
1. Provision of plentiful mechanical power to the mirror without increasing mirror's inertia, to simultaneously enable large mirror size, high resonant frequency, and wide scan angle
2. Increased actuation efficiency
3. Reduction of the mirror inertia without reducing its usable surface area

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The above-noted objects of this invention may be achieved by:
1. Moving the elements of the actuator from the mirror block to the distal ends of the mirror's torsional hinges
2. Using piezoelectric elements as the means of converting electrical power into mechanical one.
3. Providing a mechanism to convert the motion of the piezoelectric element, that is generally translational, into the rotational motion of the distal end of the mirror's torsional hinge
4. Employing MEMS technology on Silicon-On-Insulator (SOI) wafer to produce mirrors with large reflective surface in the device layer, supported by a lattice with maximum rigidity and minimal inertia in the handle layer.

BRIEF DESCRIPTION OF THE DRAWINGS

FIG. 3A (side view) illustrates generating actuation torque by shear-mode piezoelectric elements.

FIG. 3B (3-dimensional view) illustrates generating actuation torque by shear-mode piezoelectric elements.

FIG. 4A (side view) illustrates a monolithic flexure applying actuation torque to the distal ends of the torsion hinge.

FIG. 4B (3-dimensional view) illustrates a monolithic flexure applying actuation torque to the distal ends of the torsion hinge.

FIG. 5A and FIG. 5B are side and perspective views illustrating a monolithic flexure with defined thinned-down flexural points applying actuation torque to the distal ends of the torsion hinge.

FIG. 6A and FIG. 6B are side and perspective views illustrating a monolithic flexure with defined thinned-down flexural points actuated by expansion-mode piezoelectric elements applying actuation torque to the distal ends of the torsion hinge.

FIG. 7A and FIG. 7B are side and perspective views illustrating a monolithic flexure with defined thinned-down flexural points actuated by a single piezoelectric element and a floating mass in place of the other piezoelectric element.

FIG. 8A and FIG. 8B are side and perspective views illustrating a mirror block fabricated in SOI wafer.

FIG. 9A and FIG. 9B are side and perspective views illustrates an embodiment, with two expansion-mode piezoelectric elements and the flexures fabricated in the device layer of the SOI wafer.

FIG. 10A and FIG. 10B are side and perspective views illustrating a mirror fabricated in double-SOI wafer with flexures fabricated in both device layers.

FIG. 11A and FIG. 11B are side and perspective views of a laser beam scan structure in which a single silicon component forms an I-beam shaped hinge and mirror combination, which is supported and driven by pairs of expansion-mode piezoelectric elements.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this document are incorporated herein in their entirety by reference.

Furthermore, the described features, advantages, and characteristics of any particular embodiment disclosed herein, may be combined in any suitable manner with any of the other embodiments disclosed herein.

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

Figure 1:
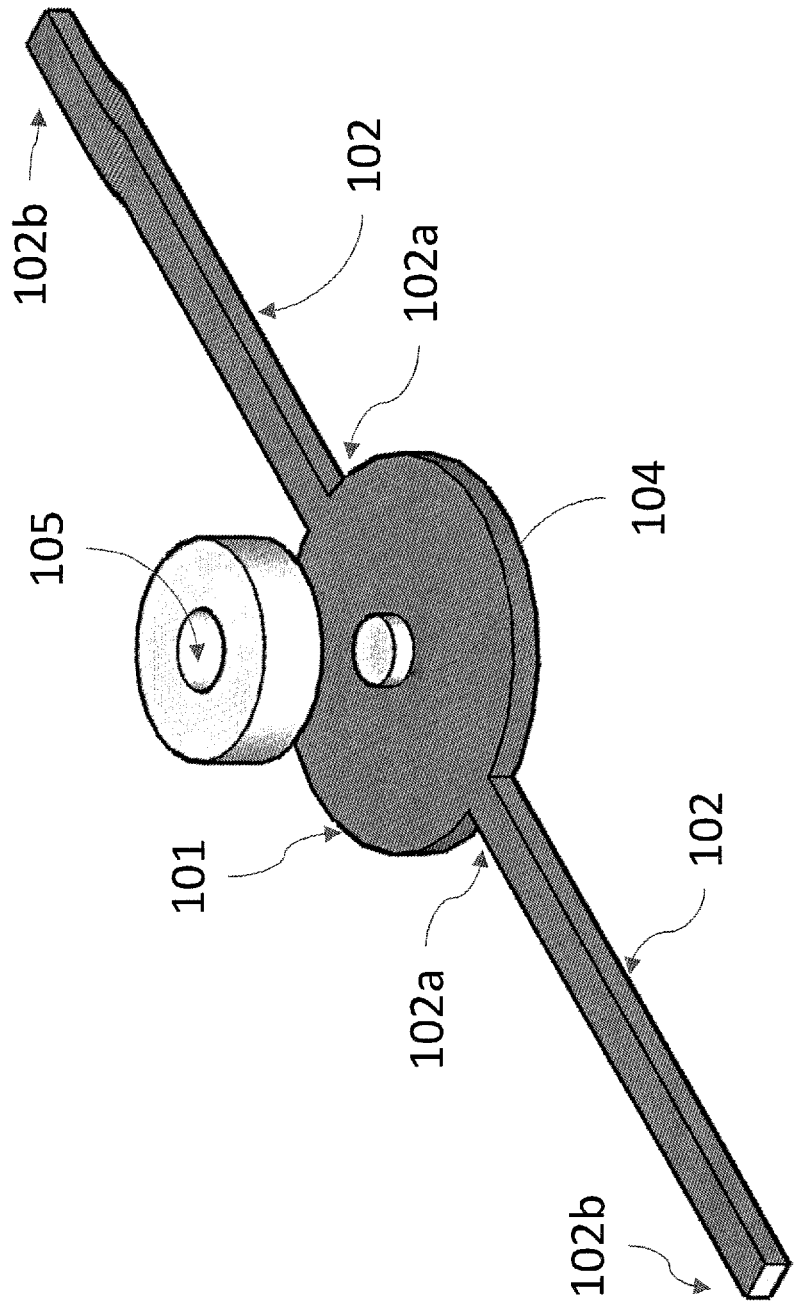
FIG. 1 illustrates prior art of fast scanning mirror.
Figure 2:
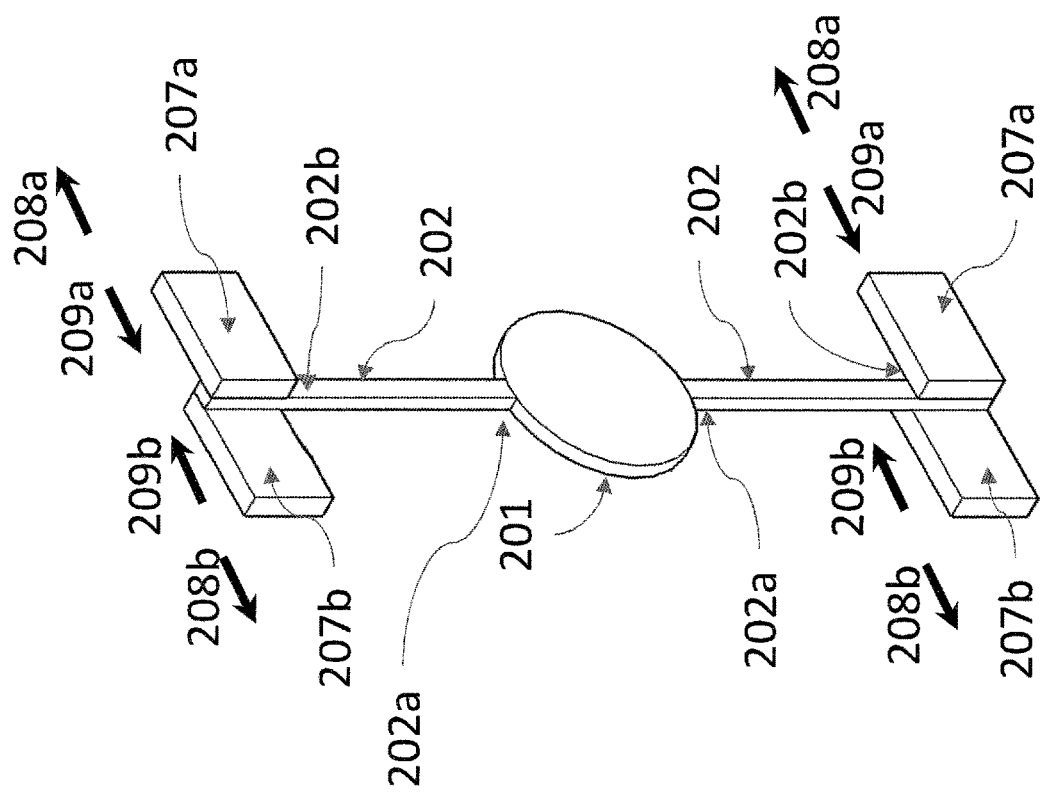
FIG. 2 illustrates applying actuation torque to the distal ends of the torsion hinge through flexures.

In the preferable embodiment illustrated on FIG. 2, the mirror block 201, which is coupled to the proximal end 202a of hinge 202, does not carry any elements of the actuator. Instead, actuation is achieved by applying the torque to the distal ends 202b of the torsion hinges. The frequency of this torque must still be equal or close to the mechanical resonant frequency of the mirror block on the torsion hinges. The actuation torque on one hinge is provided by flexures 207a and 207b attached to the opposite surfaces of the distal end 202b of the hinge. Both flexures move either away from each other, as shown by the arrows 208a and 208b, or toward each other, as shown by the arrows 209a and 209b, thus making the distal end of the hinge to rotate in one or the other direction. The other torsional hinge, if present, is actuated likewise.

FIG. 3A is a side view shown viewed along the axis of the hinge 302, which further illustrates this embodiment by showing a pair of shear-mode piezoelectric elements 306a and 306b, mounted on a stationary base 303 and attached to the flexures 307a and 307b respectively, and energized to cause the flexures to move in the opposite directions as shown on FIG. 2. The mirror block 301 is connected at points 302a to the hinge 302. Alternatively, the mirror 301 and the hinge 302 can be a single integrated piece. A spacer 310, equal in height to the combined thickness of the distal end 302b and the flexure 307b may be employed to maintain the parallelism of the flexures. Alternatively, piezoelectric elements 306a and 306b may be of different height. Yet alternatively, one of the piezoelectric elements may be replaced by a rigid column, which would reduce the rotational motion of the distal end of the hinge 302b by a factor of two, but may save cost.

FIG. 3B is a three dimensional drawing of the embodiment of FIG. 3A.

Yet alternatively, flexures 307a and 307b of FIG. 3 may be replaced by a single monolithic flexure 407, attached to both piezoelectric elements 406a and 406b, as shown on FIG. 4A (side view). The monolithic flexure 407 is thinned at locations 407t to function as a hinge. The distal end 402b of the hinge 402 is then attached to the top of the monolithic flexure 407, which is attached to both piezoelectric elements 406a and 406b which extend from base 403, while the proximal end 402a of the hinge is attached to the mirror 401. Such monolithic flexure 407 may be fabricated, for example, by 3D printing. When viewed along the axis of the hinges 402, the monolithic flexure can be, for example, "S" shaped. FIG. 4B is a three dimensional drawing of the embodiment of FIG. 4A FIG. 5 shows an improved embodiment of the monolithic flexure 407 of FIG. 4, having defined thinned-down flexural points 507c and 507d, while the rest of the monolithic flexure 507 is made of thicker material, thus increasing its rigidity and improving its ability to transmit large forces at high frequency from the piezoelectric elements 506a and 506b that may extend from a base 503. The mirror 501 may attach to the proximal end 502a of the hinge 502, while the distal end 502b of the hinge 502 may attach to one side of a platform that rests on a post protruding proximate to a thinned down portion (707c/507d) of the flexure 507.

An embodiment where the shear-mode piezoelectric elements 506a and 506b are replaced with expansion-mode piezoelectric elements 611a and 611b is shown on FIG. 6. The expansion-mode piezoelectric elements are known to provide greater force than shear mode ones. In this embodiment, they move up and down, substantially perpendicular to the top surface of the base 603, in opposite directions, causing the center portion of the flexure 607, together with the attached distal end of the mirror hinge 602b, to rotate thereby causing the hinge 602 and the mirror block 601 that is attached at the proximal ends 602a of the hinge to rotate. The monolithic flexure 607 still has two defined thinned-down flexural points 607c and 607d. Just like with the shear mode piezoelectric elements, one of the expansion-mode piezoelectric elements may be replaced by a rigid column (not shown) to save cost.

FIG. 7 shows an embodiment similar to that shown in FIGS. 6A-6B that eliminates the second piezoelectric element, and adds a floating mass 712 on the opposite side of the attachment of the flexure 707 to the distal end 702b of the hinge 702. The flexure 707 that extends from piezoelectric element 706a may have thinned-down flexural points 707c and 707d. This mass 712 may be an integral part of the flexure 707 as shown, or it can be made separately and attached to it. If the mass 712 is large enough, it would not follow the high-frequency motion of a shear-mode piezoelectric element 706a, but rather stay in place due to its inertia, thus causing the center portion of the flexure 707, together with the attached distal end 702b of the mirror hinge 702 and the mirror block 701, which is attached at the hinge's distal end 702b, to rotate. While the angular displacement of the distal end of the mirror hinge 702b would be reduced by a factor of two in comparison with various two piezoelectric elements embodiments, it may still benefit from lower cost, simplicity and ease of assembly.

FIG. 8 illustrates an embodiment of the mirror blocks 201, 301, 401 501, 601, 701, 901, 1001, and 1101 aimed at further reducing its inertia without sacrificing rigidity. To achieve this the mirror is fabricated from an Silicon-On-Insulator (SOI) wafer, having a relatively thick, for example 380 um, handle layer, and a relatively thin, for example 50 um, device layer. MEMS fabrication technology, in particular photolithography with backside-alignment, allows separate patterning of these two layers. The reflective surface of the mirror 801c is fabricated in the device layer, as a circle, or oval. The mirror block consists of the middle portion 801a and multiple fingers 801b extending toward the outer edge of the reflective surface, and preventing the thin reflective surface from deforming under substantial inertial forces arising during high-frequency oscillations. Both the middle portion 801a and fingers 801b, as well as hinges 802, of which the proximal ends 802a are shown, are fabricated in the handle layer of the SOI wafer.

A mirror so fabricated from an SOI wafer can be employed in any of the actuator embodiment discussed above. It should be noted that elements of the actuator, such as one of the flexures or spacers, can be fabricated in the device layer. For example, FIG. 9 illustrates an embodiment that is similar to the embodiment on FIG. 6, with a mirror block 901 which consists of a reflective portion of the mirror 901c and a support structure 901a. The support structure 901a is attached at a proximal end 902a of hinge 902, the distal end 902b of which joins a flexure 907. The flexure 907 may be separated from two expansion-mode piezoelectric elements 911a and 911b on each side of the hinge 902 using spacers 910a and 910b, which piezoelectric elements may extend from a base 903. In this embodiment, the flexure 907 and the reflective portion of the mirror 901c are fabricated in the device layer of the same silicon wafer. The hinge 902 and the support structure 901a are fabricated in the handle layer of the same silicon wafer.

Furthermore, a double-SOI wafer, having two thin device layers on both sides of a thick handle layer, can be used to fabricate both flexures and mount them directly onto the piezoelectric elements, avoiding the need to fabricate them from a different material using different technology. Such an embodiment is shown on FIG. 10, which uses a mirror block 1001 consisting of a reflective surface 1001c and a support structure 1001a; a hinge 1002 having proximal and distal ends 1002a/1002b, which proximal end transitions into flexures 1007a and 1007b and the distal end transitions into the support structure 1001a; and piezoelectric elements 1006a and 1006b that extend from a base 1003. In this case, the spacer 1010a, the hinge 1002 and the support structure 1001a would be fabricated in the handle layer, while the reflective surface 1001c and flexure 1007a would be part of the same first device layer. Flexure 1007b and a portion 1007e underneath spacer 1010a can be part fabricated from the same second device layer A further embodiment is shown in FIG. 11A (side view) and FIG. 11B (3D view). A single silicon component is formed by the mirror 1101, and the hinge portions 1102 and 1112, which altogether may form an I-beam shape. The proximal end 1102a of the hinge portion 1102 may transition into the mirror 1101, and the distal end 1102b of the hinge portion 1102 may transition into the hinge portion 1112. The hinge portion 1112 may be positioned laterally with respect to the hinge portion 1102, to form a T-shape, where the hinge portion 1112 is the base of the T-shape, and the hinge portion 1112 is the crosswise leg of the T shape, extending in opposing first and second directions away from the hinge portion 1112.

The distal ends of the hinge portion 1112 are attached to the pairs of expansion-mode piezoelectric elements 1111a and 1111b that extend from the stationary base 1103, and which are driven in a push pull fashion, wherein the elements 1111a and 1111b are cycled such that elements 1111a and 1111b are alternately expanded and contracted. This results in rotational energy being applied to the hinge 1102 and the mirror block 1101. Accordingly, the mirror block is rotated about the axis of the hinge 1102. The expansion-mode piezoelectric elements 1111a and 1111b provide much more force than the single piezo elements utilized in the prior art, and therefore, the mirror 1101 can be driven at a significantly higher frequency and at a wider angle.

We claim:

1. A scanning mirror comprising:
   a mirror block with a reflective surface on one side;
   one torsional hinge, said one torsional hinge being integrally formed with said mirror block as a single component;
   piezoelectric elements;
   flexural structures;
   wherein said piezoelectric elements are configured to provide translational motion;
   wherein distal ends of said one torsional hinge are attached to said flexural structures, being thereby configured to transform the translational motion of said piezoelectric elements into rotational motion of the distal ends of said one torsional hinge; and
   wherein said flexural structures are made of separate flexures attached to opposite surfaces of the distal ends of said one torsional hinge.

2. The scanning mirror of claim 1 with flexural structures made as single pieces, the distal ends of the hinges being attached to them by only one surface.

3. The scanning mirror of claim 1 with flexural structures comprising defined thinned-down flexural points.

4. The scanning mirror of claim 1 with 3D printed flexural structures.

5. The scanning mirror of claim 1 with shear-mode piezoelectric elements.

6. The scanning mirror of claim 1 with expansion-mode piezoelectric elements.

7. The scanning mirror of claim 1 with a rigid column in place of at least one of the piezoelectric elements.

8. The scanning mirror of claim 1 with a floating mass in place of at least one of the piezoelectric elements.

9. The scanning mirror of claim 1 with the mirror block and torsional hinges fabricated by silicon MEMS technology.

10. The scanning mirror of claim 9, fabricated on SOT wafer, with the mirror block and torsional hinges in the handle layer, and the reflective surface in the device layer.

11. The scanning mirror of claim 10, with the handle layer of the mirror block being selectively shaped to reduce inertia and maintain rigidity.

12. The scanning mirror of claim 9, fabricated on double SOI wafer, with the mirror block and torsional hinges in the handle layer, the reflective surface in one of the device layer, and parts of flexural structure attached to the piezoelectric elements in both device layers.

\* \* \* \* \*